(12) United States Patent
Hirose et al.

(10) Patent No.: US 10,377,445 B2
(45) Date of Patent: Aug. 13, 2019

(54) BICYCLE FRONT SPROCKET ASSEMBLY

(71) Applicant: Shimano Inc., Sakai, Osaka (JP)

(72) Inventors: Yuki Hirose, Osaka (JP); Atsuhiro Emura, Osaka (JP); Tetsu Nonoshita, Osaka (JP)

(73) Assignee: Shimano Inc., Osaka (JP)

( * ) Notice: Subject to any disclaimer, the term of this patent is extended or adjusted under 35 U.S.C. 154(b) by 139 days.

(21) Appl. No.: 15/270,656

(22) Filed: Sep. 20, 2016

(65) Prior Publication Data
US 2018/0079467 A1  Mar. 22, 2018

(51) Int. Cl.
| | | |
|---|---|---|
| *B62M 9/10* | (2006.01) | |
| *F16H 55/30* | (2006.01) | |
| *B62M 9/12* | (2006.01) | |
| *B62M 1/36* | (2013.01) | |
| *B62M 9/00* | (2006.01) | |

(52) U.S. Cl.
CPC .............. *B62M 9/105* (2013.01); *B62M 9/12* (2013.01); *F16H 55/30* (2013.01); *B62M 1/36* (2013.01); *B62M 2009/007* (2013.01)

(58) Field of Classification Search
CPC .......... B62M 9/10; B62M 9/105; B62M 9/12; F16H 55/30; Y10T 74/2165
USPC ........................................................ 474/160
See application file for complete search history.

(56) References Cited

U.S. PATENT DOCUMENTS

| | | | | |
|---|---|---|---|---|
| 2,720,119 A | * | 10/1955 | Sherman ................. | F16H 55/16 264/262 |
| 4,009,621 A | * | 3/1977 | Segawa ................... | B62M 9/105 474/160 |
| 4,318,310 A | * | 3/1982 | Segawa ................... | B62K 19/34 29/893.33 |
| 4,384,865 A | * | 5/1983 | Ueno ....................... | B62M 9/10 474/160 |
| 4,439,172 A | * | 3/1984 | Segawa ................... | B62M 9/105 474/144 |
| 4,453,924 A | * | 6/1984 | Sugino .................... | B62M 9/105 474/160 |
| 4,472,163 A | * | 9/1984 | Bottini .................... | B62M 9/10 192/64 |

(Continued)

FOREIGN PATENT DOCUMENTS

JP          3108527 U     4/2005

*Primary Examiner* — Henry Y Liu
(74) *Attorney, Agent, or Firm* — Global IP Counselors, LLP

(57) ABSTRACT

A bicycle front sprocket assembly is basically provided with a first sprocket, a second sprocket, a sprocket carrier and a chain guiding portion. The first sprocket includes a first sprocket body and a plurality of first sprocket teeth disposed on a first outer periphery of the first sprocket body, The second sprocket includes a second sprocket body and a plurality of second sprocket teeth. The second sprocket teeth are disposed on a second outer periphery of the second sprocket body. The sprocket carrier includes a torque transmitting profile and a sprocket mounting portion. The chain guiding portion is positioned between the first and second sprockets in an axial direction parallel to a rotational center axis of the bicycle front sprocket assembly. At least one of the first and second sprockets is mounted to the sprocket mounting portion of the sprocket carrier by a non-threaded fastener.

25 Claims, 17 Drawing Sheets

(56) References Cited

U.S. PATENT DOCUMENTS

| | | | | |
|---|---|---|---|---|
| 4,586,914 A * | 5/1986 | Nagano | B62M 9/105 | 474/160 |
| 4,598,608 A * | 7/1986 | Ueno | B62M 9/105 | 474/160 |
| 4,867,733 A * | 9/1989 | Yamanoi | B62M 9/00 | 474/161 |
| 4,909,687 A * | 3/1990 | Bradley | F16B 19/1054 | 411/43 |
| 5,194,051 A * | 3/1993 | Nagano | B62M 9/10 | 474/160 |
| 5,213,550 A * | 5/1993 | Wu | B62M 9/105 | 474/160 |
| 5,480,359 A * | 1/1996 | Tani | B62M 3/003 | 474/160 |
| 5,609,536 A * | 3/1997 | Hsu | B62M 9/10 | 474/160 |
| 5,766,106 A * | 6/1998 | Edwards | B62M 9/105 | 474/160 |
| 5,935,034 A * | 8/1999 | Campagnolo | B62M 9/10 | 474/160 |
| 5,954,604 A * | 9/1999 | Nakamura | B62M 9/10 | 474/158 |
| 5,971,878 A * | 10/1999 | Leng | F16H 55/30 | 474/160 |
| 6,014,808 A * | 1/2000 | Santi | F16H 55/06 | 29/893.3 |
| 6,024,662 A * | 2/2000 | Fujimoto | B62M 3/003 | 280/261 |
| 6,264,575 B1 * | 7/2001 | Lim | B62M 9/10 | 192/64 |
| 6,273,836 B1 * | 8/2001 | Thompson | B62M 9/06 | 474/160 |
| 6,382,381 B1 * | 5/2002 | Okajima | B60B 1/0215 | 192/64 |
| 6,428,437 B1 * | 8/2002 | Schlanger | B62M 9/10 | 474/160 |
| 6,443,865 B1 * | 9/2002 | Yamanaka | B62J 13/00 | 474/144 |
| 6,572,500 B2 * | 6/2003 | Tetsuka | B62M 9/10 | 474/160 |
| 6,805,645 B2 * | 10/2004 | Mao | B62M 9/10 | 474/152 |
| 6,860,171 B1 * | 3/2005 | Nanko | B62M 3/003 | 474/160 |
| 7,258,638 B2 * | 8/2007 | Valle | B62M 9/105 | 474/152 |
| 7,344,463 B2 * | 3/2008 | Reiter | B62M 9/10 | 474/160 |
| 7,503,864 B2 * | 3/2009 | Nonoshita | B62M 9/105 | 474/160 |
| 7,824,287 B2 * | 11/2010 | Nonoshita | B62M 9/105 | 474/152 |
| 7,850,564 B2 * | 12/2010 | Nonoshita | B62M 9/105 | 474/152 |
| 7,854,673 B2 * | 12/2010 | Oseto | B62M 9/10 | 403/353 |
| 7,871,347 B2 * | 1/2011 | Kamada | B62M 9/10 | 474/152 |
| 7,931,553 B2 * | 4/2011 | Tokuyama | B62M 9/10 | 474/144 |
| 7,967,709 B2 * | 6/2011 | Emura | B62M 9/105 | 474/160 |
| 8,235,850 B2 * | 8/2012 | Lin | B62M 9/105 | 474/160 |
| 8,550,944 B2 * | 10/2013 | Esquibel | B62M 9/10 | 474/160 |
| 8,764,594 B2 * | 7/2014 | Dal Pra' | F16H 55/30 | 474/160 |
| 8,821,330 B2 * | 9/2014 | Dal Pra' | B62M 9/10 | 474/160 |
| 8,905,878 B2 * | 12/2014 | Loy | B62M 9/10 | 474/160 |
| 8,956,254 B2 * | 2/2015 | Tokuyama | B62M 9/12 | 474/160 |
| 8,968,130 B2 * | 3/2015 | Liao | B62M 9/10 | 474/160 |
| 9,182,027 B2 * | 11/2015 | Reiter | B62M 9/105 | |
| 9,403,578 B1 * | 8/2016 | Yoshida | B62M 9/10 | |
| 9,555,855 B2 * | 1/2017 | Iwai | B62M 9/105 | |
| 9,771,128 B2 * | 9/2017 | Sugimoto | B62M 9/105 | |
| 9,829,085 B2 * | 11/2017 | Iwai | F16H 55/303 | |
| 2004/0092352 A1 * | 5/2004 | Chiang | B62M 9/10 | 474/160 |
| 2005/0032596 A1 * | 2/2005 | Nonoshita | B62K 19/16 | 474/175 |
| 2005/0282672 A1 * | 12/2005 | Nonoshita | B62M 9/105 | 474/161 |
| 2006/0205549 A1 * | 9/2006 | Nonoshita | B62M 9/105 | 474/160 |
| 2007/0129193 A1 * | 6/2007 | Nonoshita | B62M 9/10 | 474/160 |
| 2007/0265122 A1 * | 11/2007 | Emura | B62M 9/105 | 474/152 |
| 2008/0004143 A1 * | 1/2008 | Kanehisa | B62M 9/10 | 474/160 |
| 2008/0058144 A1 * | 3/2008 | Oseto | B62M 9/10 | 474/160 |
| 2008/0202284 A1 * | 8/2008 | Valle | B62M 3/00 | 74/594.1 |
| 2008/0312016 A1 * | 12/2008 | Chiang | B62M 9/105 | 474/116 |
| 2009/0042679 A1 * | 2/2009 | Valle | B62M 9/10 | 474/152 |
| 2009/0042682 A1 * | 2/2009 | Dal Pra' | B62M 9/10 | 474/160 |
| 2016/0101825 A1 * | 4/2016 | Braedt | H05K 999/99 | 474/160 |

* cited by examiner

BICYCLE FRONT SPROCKET ASSEMBLY

BACKGROUND

Field of the Invention

This invention generally relates to a bicycle front sprocket assembly. More specifically, the present invention relates to a bicycle front sprocket assembly in which at least one sprocket is attached to a bicycle crank arm without using a threaded fastener.

Background Information

Most bicycles have a drive unit or drive train that uses a chain to transmit the pedaling action from the rider to the rear wheel. A bicycle drive train typically has at least one front sprocket provided on a bicycle crank assembly of the bicycle and at least one rear sprocket provided on a rear hub of the bicycle. The chain wraps around the front and rear sprockets. Thus, rotation of the bicycle crank assembly by the rider is transmitted to the rear wheel by the chain, which meshes with the front and rear sprockets. Some bicycles are provided with a plurality of front sprockets and a plurality of rear sprockets in which gears are shifted with derailleurs. The front sprockets are often attached to a crank arm to form a bicycle front crank assembly. In conventional bicycle front crank assemblies, the smallest sprocket (low gear) is attached to the crank arm via a plurality of fixing nuts and a plurality of bolts. With this configuration, the size of the crank arm tends to be large in the area around the fixing nuts and the bolts. As a result, with this configuration, the bicycle front crank assembly becomes heavy. One example of a conventional bicycle front crank assembly is disclosed in U.S. Pat. No. 5,480,359.

SUMMARY

Generally, the present disclosure is directed to various features of a bicycle front sprocket assembly. In one feature, a bicycle front sprocket assembly is provided with at least two sprockets in which at least one of the sprockets is attached to the crank arm without using a threaded fastener. In another feature, a bicycle front sprocket assembly is provided with one of the smaller sprockets being attached to the crank arm without using a threaded fastener.

One aspect of the present invention is to provide a bicycle front sprocket assembly that is lighter than a conventional bicycle front sprocket assembly in which the sprockets are attached to the crank arm with using a threaded fastener.

In view of the state of the known technology and in accordance with a first aspect of the present disclosure, a bicycle front sprocket assembly is provided that basically comprises a first sprocket, a second sprocket, a sprocket carrier and a chain guiding portion. The first sprocket includes a first sprocket body and a plurality of first sprocket teeth. The first sprocket teeth are disposed on a first outer periphery of the first sprocket body. The second sprocket includes a second sprocket body and a plurality of second sprocket teeth. The second sprocket teeth are disposed on a second outer periphery of the second sprocket body. The sprocket carrier includes a torque transmitting profile and a sprocket mounting portion. The chain guiding portion is positioned between the first sprocket teeth and the second sprocket teeth in an axial direction parallel to a rotational center axis of the bicycle front sprocket assembly. At least one of the first sprocket and the second sprocket is mounted to the sprocket mounting portion of the sprocket carrier by a non-threaded fastener. In this case, the bicycle front sprocket assembly is configured to be lighter than a conventional bicycle front sprocket assembly in which the sprocket is attached to the crank arm with using a threaded fastener.

In accordance with a second aspect of the present invention, a bicycle front sprocket assembly is provided that basically comprises a first sprocket, a second sprocket and a sprocket carrier. The first sprocket includes a first sprocket body and a plurality of first sprocket teeth. The first sprocket teeth are disposed on a first outer periphery of the first sprocket body. Each of the first sprocket teeth has a first axial tooth center plane. The second sprocket includes a second sprocket body and a plurality of second sprocket teeth. The second sprocket teeth are disposed on a second outer periphery of the second sprocket body. Each of the second sprocket teeth has a second axial tooth center plane. The sprocket carrier includes a torque transmitting profile and a sprocket mounting portion. The sprocket carrier is a separate member from both of the first and second sprockets. At least one of the first sprocket and the second sprocket is mounted to the sprocket mounting portion of the sprocket carrier by a non-threaded fastener. A maximum axial distance defined between the first axial tooth center plane and the second axial tooth center plane in an axial direction parallel to a rotational center axis of the bicycle front sprocket assembly is smaller than or equal to 9.5 mm. In this case, the bicycle front sprocket assembly is configured to be lighter than a conventional bicycle front sprocket assembly in which the sprocket is attached to the crank arm with using a threaded fastener.

In accordance with a third aspect of the present invention, a bicycle front sprocket assembly is provided that basically comprises a first sprocket, a second sprocket and a sprocket carrier. The first sprocket includes a first sprocket body and a plurality of first sprocket teeth. The first sprocket teeth are disposed on a first outer periphery of the first sprocket body. The second sprocket includes a second sprocket body and a plurality of second sprocket teeth. The second sprocket teeth are disposed on a second outer periphery of the second sprocket body. The sprocket carrier includes a torque transmitting profile and a sprocket mounting portion. At least one of the first sprocket and the second sprocket is mounted to the sprocket mounting portion of the sprocket carrier by a non-threaded fastener. At least one of the first sprocket teeth and the second sprocket teeth includes at least one outer-link engaging tooth having a first axial width and at least one inner-link engaging tooth having a second axial width. The first axial width of the outer link engaging tooth is larger than the second axial width of the inner link engaging tooth. In this case, the bicycle front sprocket assembly is configured to be lighter than a conventional bicycle front sprocket assembly in which the sprocket is attached to the crank arm with using a threaded fastener, and configured such that the teeth can be made to reliably engage a bicycle chain.

In accordance with a fourth aspect of the present invention, a bicycle front sprocket assembly is provided that basically comprises a first sprocket, a second sprocket and a sprocket carrier. The first sprocket includes a first sprocket body and a plurality of first sprocket teeth. The first sprocket teeth are disposed on a first outer periphery of the first sprocket body. Each of the first sprocket teeth has a first axial tooth center plane. The second sprocket includes a second sprocket body and a plurality of second sprocket teeth. The second sprocket teeth are disposed on a second outer periphery of the second sprocket body. Each of the second sprocket teeth has a second axial tooth center plane. The sprocket carrier includes a torque transmitting profile. At least one of the first and second sprockets and the sprocket carrier has an axial protuberance integrally formed therewith as a unitary one-piece member so as to be positioned between the sprocket carrier and one of the first sprocket and the second sprocket in an axial direction parallel to a rotational center axis of the bicycle front sprocket assembly. The one of the first sprocket and the second sprocket is mounted to the sprocket carrier by a non-threaded fastener extending into the axial protuberance. In this case, the bicycle front sprocket assembly is configured to be lighter than a conventional bicycle front sprocket assembly in which the sprocket is attached to the crank arm with using a threaded fastener, and to simplify manufacturing of the bicycle front sprocket assembly.

In accordance with a fifth aspect of the present invention, a bicycle front sprocket assembly is provided that basically comprises a first sprocket, a second sprocket and a sprocket carrier. The first sprocket includes a first sprocket body made of a non-metallic material and a plurality of first sprocket teeth. The first sprocket teeth are disposed on a first outer periphery of the first sprocket body. The second sprocket includes a second sprocket body and a plurality of second sprocket teeth. The second sprocket teeth are disposed on a second outer periphery of the second sprocket body. The sprocket carrier includes a torque transmitting profile. At least one of the first sprocket and the second sprocket is mounted to the sprocket carrier by a non-threaded fastener. In this case, the bicycle front sprocket assembly is configured to be lighter than a conventional bicycle front sprocket assembly in which the sprocket is attached to the crank arm with using a threaded fastener.

In accordance with a sixth aspect of the present invention, the bicycle front sprocket assembly according to the second aspect is configured so that the maximum axial distance defined between the first axial tooth center plane and the second axial tooth center plane in the axial direction is larger than or equal to 7.0 mm. In this case, the bicycle front sprocket assembly is configured to be lighter than a conventional bicycle front sprocket assembly in which the sprocket is attached to the crank arm with using a threaded fastener.

In accordance with a seventh aspect of the present invention, the bicycle front sprocket assembly according to the second aspect is configured so that the sprocket carrier is axially positioned between the first sprocket and the second sprocket in the axial direction. In this case, the sprocket carrier of the bicycle front sprocket assembly is configured to provide the desired axial spacing between the first sprocket and the second sprocket in the axial direction.

In accordance with an eighth aspect of the present invention, the bicycle front sprocket assembly according to the first aspect is configured so that each of the first sprocket and the second sprocket is mounted to the sprocket mounting portion of the sprocket carrier by the non-threaded fastener. In this case, the bicycle front sprocket assembly can be made lighter.

In accordance with a ninth aspect of the present invention, the bicycle front sprocket assembly according to the first aspect is configured so that the at least one of the first sprocket and the second sprocket is mounted to the sprocket mounting portion of the sprocket carrier by a plurality of the non-threaded fasteners. In this case, the bicycle front sprocket assembly is further configured to provide a secure connection between at least one of the first and second sprockets and the sprocket mounting portion of the sprocket carrier.

In accordance with a tenth aspect of the present invention, the bicycle front sprocket assembly according to any one of the first to ninth aspects is configured so that each of the first sprocket and the second sprocket is mounted to the sprocket mounting portion of the sprocket carrier by a plurality of the non-threaded fasteners. In this case, the bicycle front sprocket assembly is further configured to provide a secure connection between the first and second sprockets and the sprocket mounting portion of the sprocket carrier.

In accordance with an eleventh aspect of the present invention, the bicycle front sprocket assembly according to any one of the first to tenth aspects is configured so that at least one of the first sprocket teeth and the second sprocket teeth includes at least one outer-link engaging tooth having a first axial width and at least one inner-link engaging tooth having a second axial width. The first axial width of the outer link engaging tooth is larger than the second axial width of the inner link engaging tooth. In this case, the bicycle front sprocket assembly is configured such that at least one tooth of at least one of the first and second sprockets can be made to reliably engage a bicycle chain.

In accordance with a twelfth aspect of the present invention, the bicycle front sprocket assembly according to any one of the first to eleventh aspects is configured so that each of the first and second sprocket teeth includes the at least one outer-link engaging tooth and the at least one inner-link engaging tooth. In this case, the bicycle front sprocket assembly is configured such that at least one tooth of each of the first and second sprockets can be made to reliably engage a bicycle chain.

In accordance with a thirteenth aspect of the present invention, the bicycle front sprocket assembly according to any one of the first to twelfth aspects is configured so that the at least one outer-link engaging tooth of each of the first and second sprocket teeth includes a plurality of outer-link engaging teeth. The at least one inner-link engaging tooth of each of the first and second sprocket teeth includes a plurality of inner-link engaging teeth. In this case, the bicycle front sprocket assembly is configured such that the teeth of each of the first and second sprockets can be made to reliably engage a bicycle chain.

In accordance with a fourteenth aspect of the present invention, the bicycle front sprocket assembly according to any one of the first to thirteenth aspects is configured so that at least one of the first and second sprockets and the sprocket carrier has an axial protuberance integrally formed therewith as a unitary one-piece member so as to be positioned between the sprocket carrier and the one of the first sprocket and the second sprocket in the axial direction. The non-threaded fastener extends into the axial protuberance. In this case, the first and second sprockets and the sprocket carrier of the bicycle front sprocket assembly are configured such that the bicycle front sprocket assembly is relatively simple to manufacture.

In accordance with a fifteenth aspect of the present invention, the bicycle front sprocket assembly according to the fourteenth aspect is configured so that the axial protuberance is integrally formed with the sprocket carrier. In this case, the sprocket carrier of the bicycle front sprocket assembly is configured such that the bicycle front sprocket assembly is relatively simple to manufacture.

In accordance with a sixteenth aspect of the present invention, the bicycle front sprocket assembly according to any one of the second to fifteenth aspects further comprises a chain guiding portion positioned between the first sprocket teeth and the second sprocket teeth in the axial direction. In this case, the bicycle front sprocket assembly is configured with a chain guiding portion to assist in shifting between the first and second sprockets.

In accordance with a seventeenth aspect of the present invention, the bicycle front sprocket assembly according to any one of the first to sixteenth aspects is configured so that the first sprocket body is at least partly made of a non-metallic material. In this case, the first sprocket body is at least partly made of a non-metallic material so that the bicycle front sprocket assembly can be made lighter.

In accordance with an eighteenth aspect of the present invention, the bicycle front sprocket assembly according to any one of the first to seventeenth aspects is configured so that the first sprocket teeth are made of a metallic material. In this case, the first sprocket teeth are made of a metallic material so that the first sprocket teeth are durable.

In accordance with a nineteenth aspect of the present invention, the bicycle front sprocket assembly according to any one of the first to eighteenth aspects is configured so that the first sprocket body is integrally molded onto the first sprocket teeth. In this case, the first sprocket body is integrally molded onto the first sprocket teeth so that the bicycle front sprocket assembly can be economically made.

In accordance with a twentieth aspect of the present invention, the bicycle front sprocket assembly according to any one of the first to nineteenth aspects is configured so that the second sprocket teeth are made of a metallic material and attached to the sprocket carrier by the non-threaded fastener. In this case, the second sprocket teeth are made of a metallic material so that the second sprocket teeth are durable while being lightweight.

In accordance with a twenty-first aspect of the present invention, the bicycle front sprocket assembly according to any one of the first to twentieth aspects is configured so that the non-threaded fastener includes a pin non-detachably fastening the at least one of the first sprocket and the second sprocket to the sprocket mounting portion of the sprocket carrier. In this case, at least one of the first and second sprockets can be easily mounted to the sprocket carrier.

In accordance with a twenty-second aspect of the present invention, the bicycle front sprocket assembly according to the twenty-first aspect is configured so that the pin includes a rive. In this case, at least one of the first and second sprockets can be easily mounted to the sprocket carrier.

In accordance with a twenty-third aspect of the present invention, the bicycle front sprocket assembly according to any one of the first to twenty-second aspects is configured so that the sprocket carrier includes a crank arm mounting portion that includes a plurality of splines configured to engage a mounting boss of a bicycle crank arm in a state where the sprocket carrier is mounted to the bicycle crank arm, the rotational center axis passing through the mounting boss. In this case, the sprocket carrier can be provided as part of a crank arm.

In accordance with a twenty-fourth aspect of the present invention, a bicycle front sprocket assembly is provided that basically comprises a first sprocket, a second sprocket and a sprocket carrier. The first sprocket includes a first sprocket body at least partly made of a non-metallic material and a plurality of first sprocket teeth. The first sprocket teeth are disposed on a first outer periphery of the first sprocket body. The second sprocket includes a second sprocket body and a plurality of second sprocket teeth. The second sprocket teeth are disposed on a second outer periphery of the second sprocket body. The sprocket carrier integrally provided with one of the first sprocket and the second sprocket. The sprocket carrier includes a crank arm mounting portion that includes a plurality of splines configured to engage a mounting boss of a bicycle crank arm in a state where the sprocket carrier is mounted to the bicycle crank arm. A rotational center axis of the bicycle crank arm passes through the mounting boss. In this case, the bicycle front sprocket assembly is configured to be lighter than a conventional bicycle front sprocket assembly in which the sprocket is attached to the crank arm with using a threaded fastener.

In accordance with a twenty-fifth aspect of the present invention, a bicycle front sprocket assembly is provided that basically comprises a first sprocket, a second sprocket, a sprocket carrier and a chain guiding portion. The first sprocket includes a first sprocket body and a plurality of first sprocket teeth. The first sprocket teeth are disposed on a first outer periphery of the first sprocket body. Each of the first sprocket teeth has a first axial tooth center plane. The second sprocket includes a second sprocket body and a plurality of second sprocket teeth. The second sprocket teeth are disposed on a second outer periphery of the second sprocket body. Each of the second sprocket teeth has a second axial tooth center plane. The sprocket carrier includes a torque transmitting profile and a sprocket mounting portion. The chain guiding portion is positioned between the first sprocket teeth and the second sprocket teeth in an axial direction parallel to a rotational center axis of the bicycle front sprocket assembly. A maximum axial distance is defined between the first axial tooth center plane and the second axial tooth center plane in the axial direction. The maximum axial distance is smaller than or equal to 9.5 mm. At least one of the first sprocket teeth and the second sprocket teeth includes at least one outer-link engaging tooth having a first axial width and at least one inner-link engaging tooth having a second axial width. The first axial width of the outer link engaging tooth is larger than the second axial width of the inner link engaging tooth.

Also other objects, features, aspects and advantages of the disclosed bicycle front sprocket assembly will become apparent to those skilled in the art from the following detailed description, which, taken in conjunction with the annexed drawings, discloses preferred embodiments of the bicycle front sprocket assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
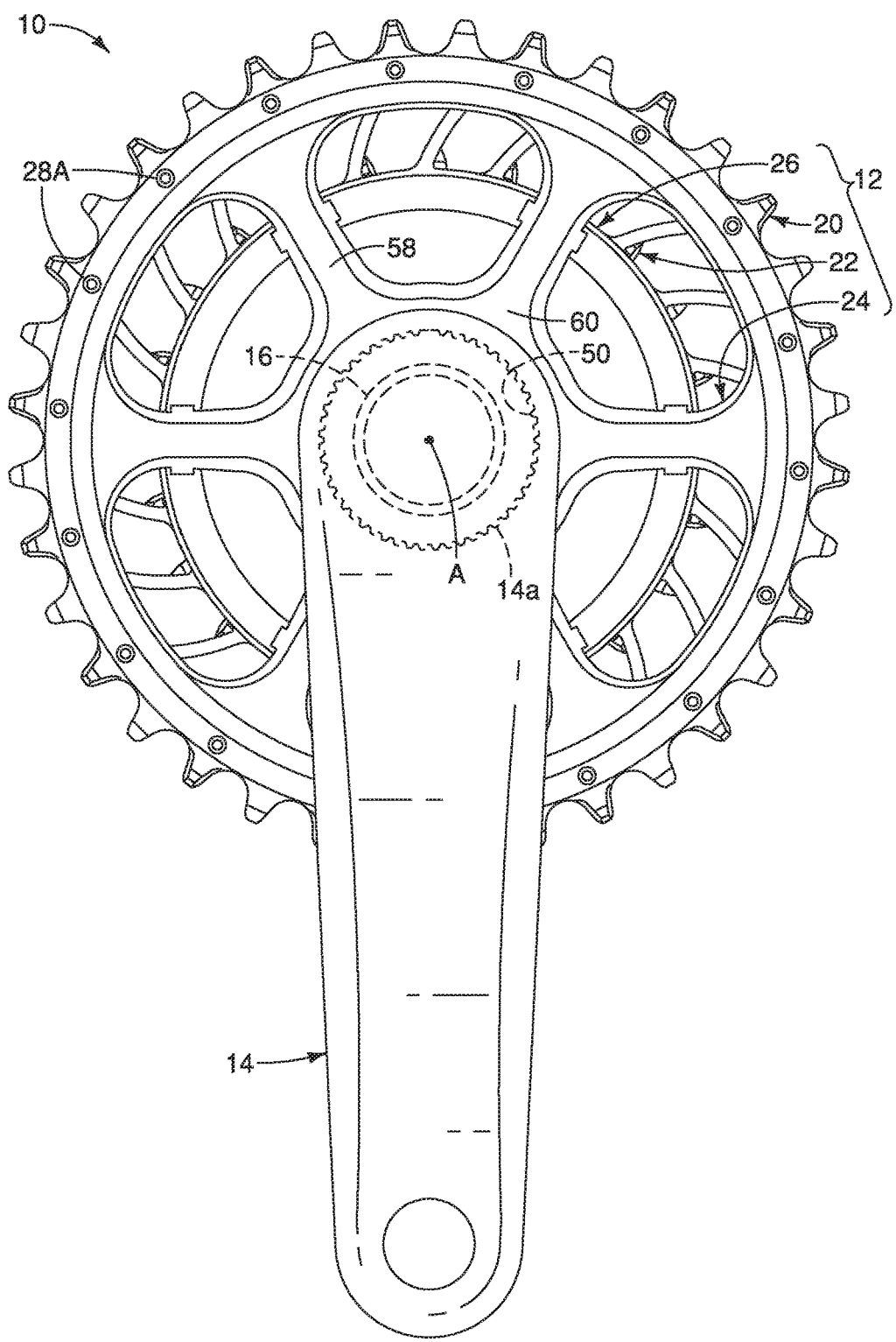
FIG. 1 is an outside elevational view of a bicycle crank assembly having a bicycle front sprocket assembly configured in accordance with a first embodiment.
Figure 2:
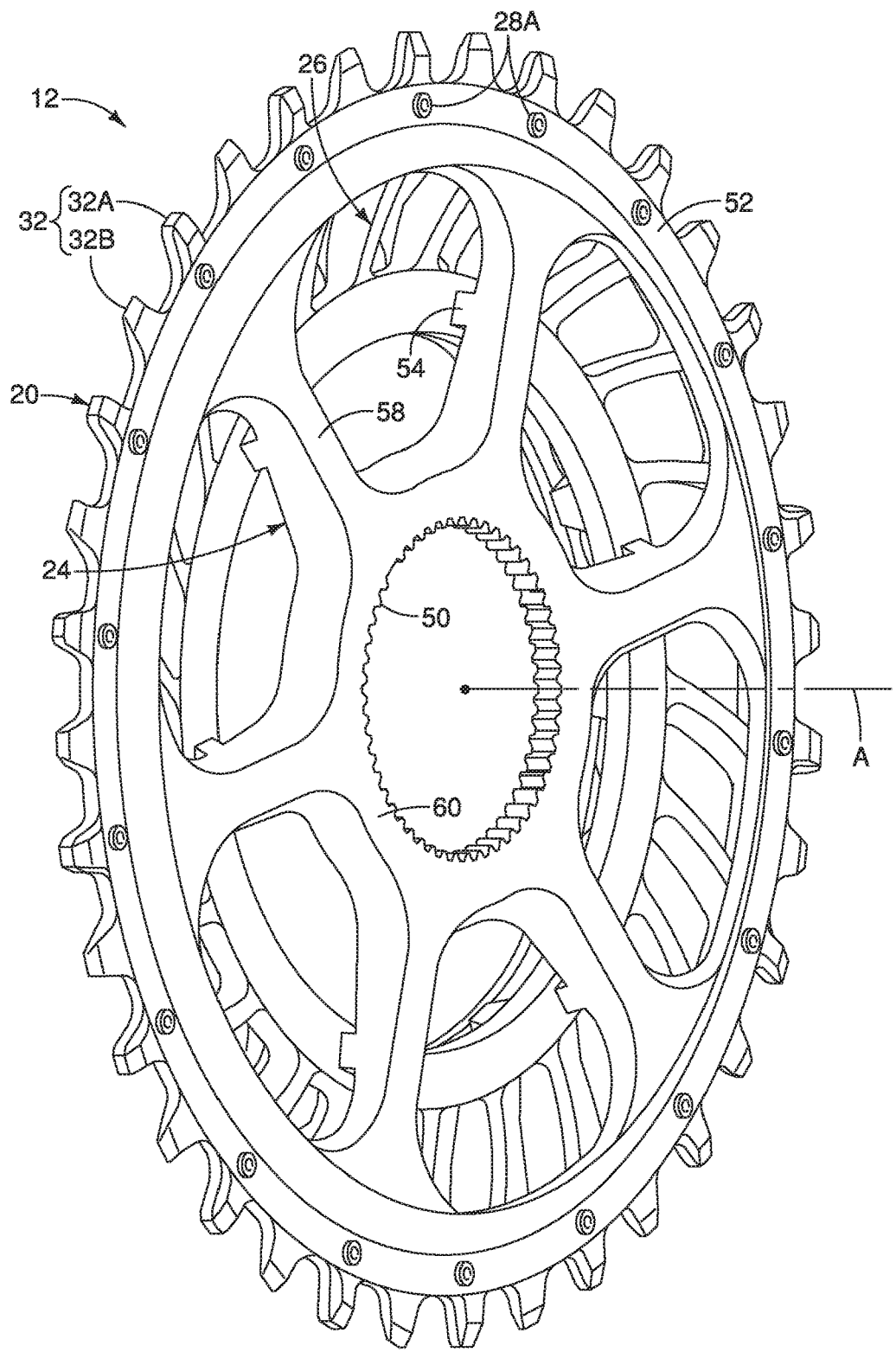
FIG. 2 is an outside perspective view of the bicycle front sprocket assembly illustrated in FIG. 1.
Figure 3:
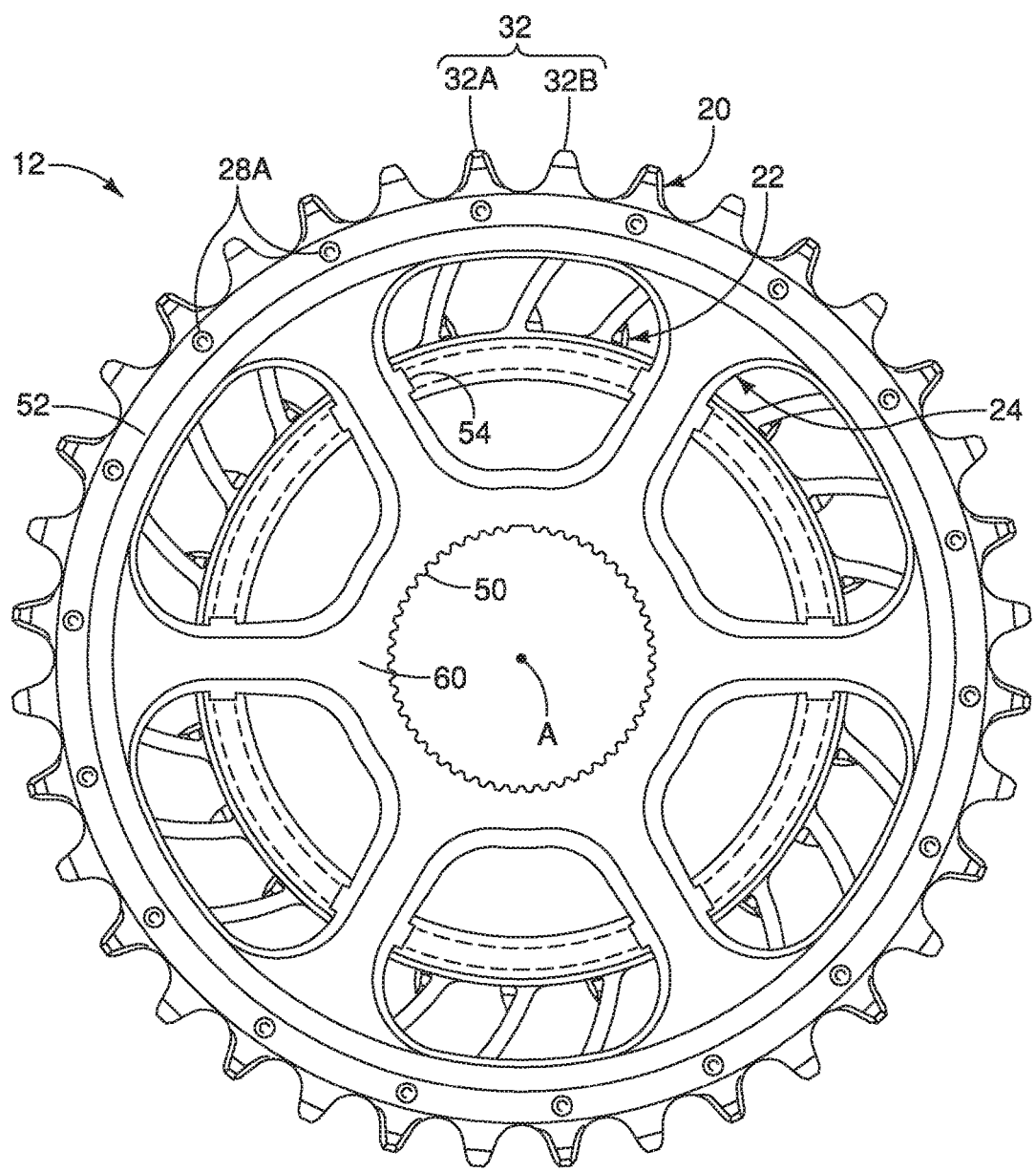
FIG. 3 is an outside elevational view of the bicycle front sprocket assembly illustrated in FIGS. 1 and 2.

Referring initially to FIG. 1, a bicycle crank assembly 10 according to a first embodiment is illustrated. In the first embodiment, the bicycle crank assembly 10 basically comprises a bicycle front sprocket assembly 12, a crank arm 14 and a crankshaft 16. The crank arm 14 is integrally and non-rotatably fixed to one end of the crankshaft 16. Typically, a second crank arm (not shown) is non-rotatably attached to the other end of the crankshaft 16. The crankshaft 16 defines a rotational center axis A of the bicycle crank assembly 10.

In the first embodiment, as seen in FIGS. 2 to 7, the bicycle front sprocket assembly 12 basically comprises a first sprocket 20, a second sprocket 22 and a sprocket carrier 24. Also in the first embodiment, the bicycle front sprocket assembly 12 further comprises a chain guiding portion 26. Basically, the sprocket carrier 24 is configured to support both of the first and second sprockets 20 and 22 on the crank arm 14. In particular, in the first embodiment, the bicycle front sprocket assembly 12 further comprises a plurality of first non-threaded fasteners 28A for securing the first sprocket 20 to the sprocket carrier 24 and a plurality of second non-threaded fasteners 28B for securing the second sprocket 22 to the sprocket carrier 24.

Figure 8:
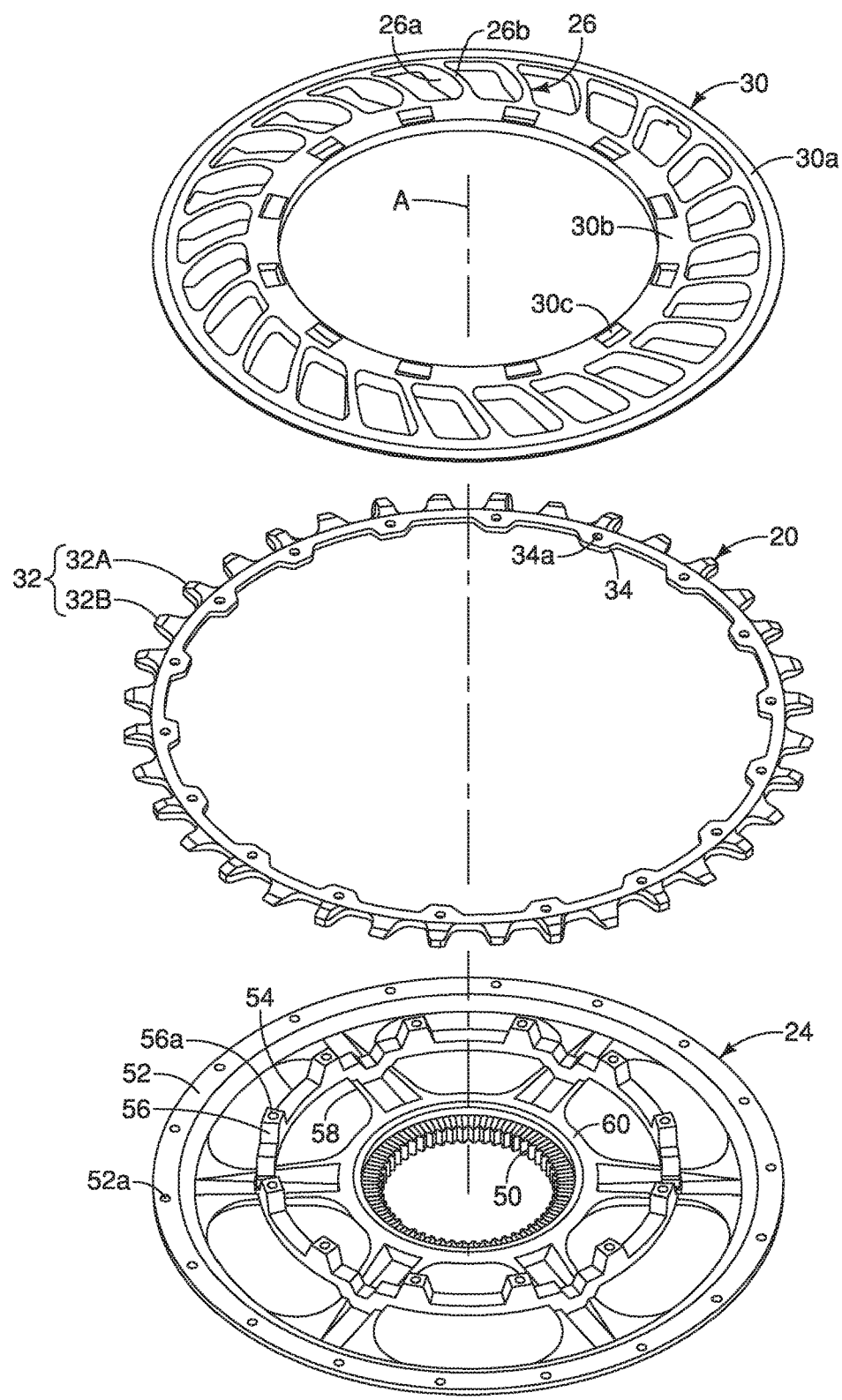
FIG. 8 is a partially exploded perspective view of selected parts of the bicycle front sprocket assembly illustrated in FIGS. 1 to 7.
Figure 9:
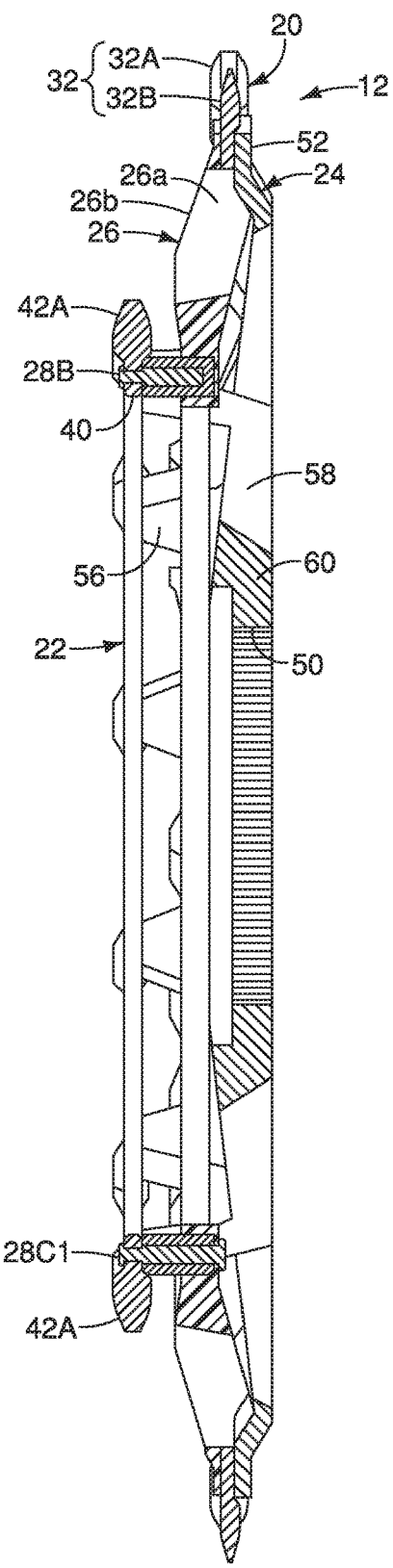
FIG. 9 is a cross sectional view of the bicycle front sprocket assembly illustrated in FIGS. 1 to 8 as seen along section line 9-9 of FIG. 5, except that one of the non-threaded fasteners for securing the second sprocket to the sprocket carrier has been modified to show a rivet type of attachment instead of the press fit type of attachment.
Figure 12:
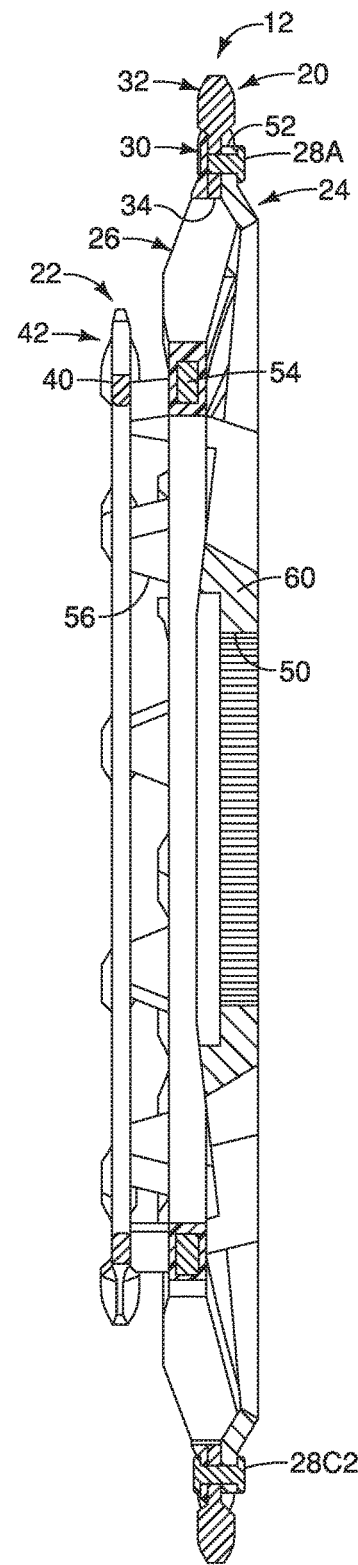
FIG. 12 is a cross sectional view of the bicycle front sprocket assembly illustrated in FIGS. 1 to 11 as seen along section line 12-12 of FIG. 5, except that one of the non-threaded fasteners for securing the second sprocket to the sprocket carrier has been modified to show a rivet type of attachment instead of the press fit type of attachment.

In FIGS. 9 and 12, a modification of the bicycle front sprocket assembly 12 is illustrated in which one of the first non-threaded fasteners 28A is replaced with a non-threaded fastener 28C1 (FIG. 9) and one of the second non-threaded fasteners 28B (FIG. 12) is replaced with a non-threaded fastener 28C2. Typically, as shown in FIGS. 1 to 8, only the first and second non-threaded fasteners 28A and 28B are used. However, any combination of the first and second non-threaded fasteners 28A and 28B and the non-threaded fasteners 28C1 and 28C2 can be used to secure the first and second sprockets 20 and 22 to the sprocket carrier 24. Therefore, only the non-threaded fasteners 28C1 and 28C2 can be used to secure the first and second sprockets 20 and 22 to the sprocket carrier 24.

Basically, the first and second sprockets 20 and 22 are bicycle sprockets in which the first sprocket 20 constitutes a large bicycle sprocket and in which the second sprocket 22 constitutes a small bicycle sprocket. More simply, the first sprocket 20 can be referred to as a large sprocket and the second sprocket 22 can be referred to as a small sprocket. The first sprocket 20 basically includes a first sprocket body 30 and a plurality of first sprocket teeth 32 disposed on a first outer periphery of the first sprocket body 30. Here, the first sprocket 20 also includes an attachment portion 34 for interconnecting the sprocket carrier 24 and the first sprocket teeth 32. On the other hand, the second sprocket 22 basically includes a second sprocket body 40 and a plurality of second sprocket teeth 42. The second sprocket teeth 42 are disposed on a second outer periphery of the second sprocket body 40.

As seen in FIGS. 8 to 12, in the first embodiment, the first sprocket body 30 includes the chain guiding portion 26. Preferably, to reduce an overall weight of the bicycle front sprocket assembly 12, the first sprocket body 30 is at least partly made of a non-metallic material. More preferably, the first sprocket body 30 is made of a non-metallic material, and thus, the chain guiding portion 26 is also made of a non-metallic material. For example, the chain guiding portion 26 and the first sprocket body 30 are formed of a resin material or a fiber reinforced resin material. On the other hand, the first sprocket teeth 32 are made of a metallic material. The first sprocket body 30 is integrally molded onto the first sprocket teeth 32. In this way, the first sprocket teeth 32 are fixed to the first sprocket body 30.

Here, in the first embodiment, the first sprocket teeth 32 are integrally formed with the attachment portion 34 as a one-piece member. As a result, the first sprocket teeth 32 and the attachment portion 34 are preferably formed of a metallic material suitable for bicycle sprocket teeth. For example, the first sprocket teeth 32 and the attachment portion 34 are formed of aluminum, stainless steel, titanium or other similar metallic material. The attachment portion 34 has a plurality of openings 34a that receives a portion of the non-metallic material that forms the first sprocket body 30. In other words, the first sprocket body 30 is over molded onto the attachment portion 34 such that the non-metallic material extends into the openings 34a of the attachment portion 34.

Similarly, the second sprocket teeth 42 are made of a metallic material. Here, in the first embodiment, the second sprocket body 40 and the second sprocket teeth 42 are integrally formed as a one-piece member. The second sprocket body 40 and the second sprocket teeth 42 are preferably formed of a metallic material suitable for bicycle sprocket teeth. For example, second sprocket body 40 and the second sprocket teeth 42 are formed of aluminum, stainless steel, titanium or other similar metallic material.

In the first embodiment, the total number of the first sprocket teeth 32 is greater than a total number of the second sprocket teeth 42. As a result, the second sprocket 22 has a smaller overall diameter than the first sprocket 20. Thus, the second sprocket 22 is disposed on a bicycle frame facing side of the first sprocket 20. The first and second sprockets 20 and 22 are front sprockets that are configured to selectively engage a bicycle chain (not shown). Typically, a front derailleur (not shown) is used to shift the bicycle chain between the first and second sprockets 20 and 22.

Figure 4:
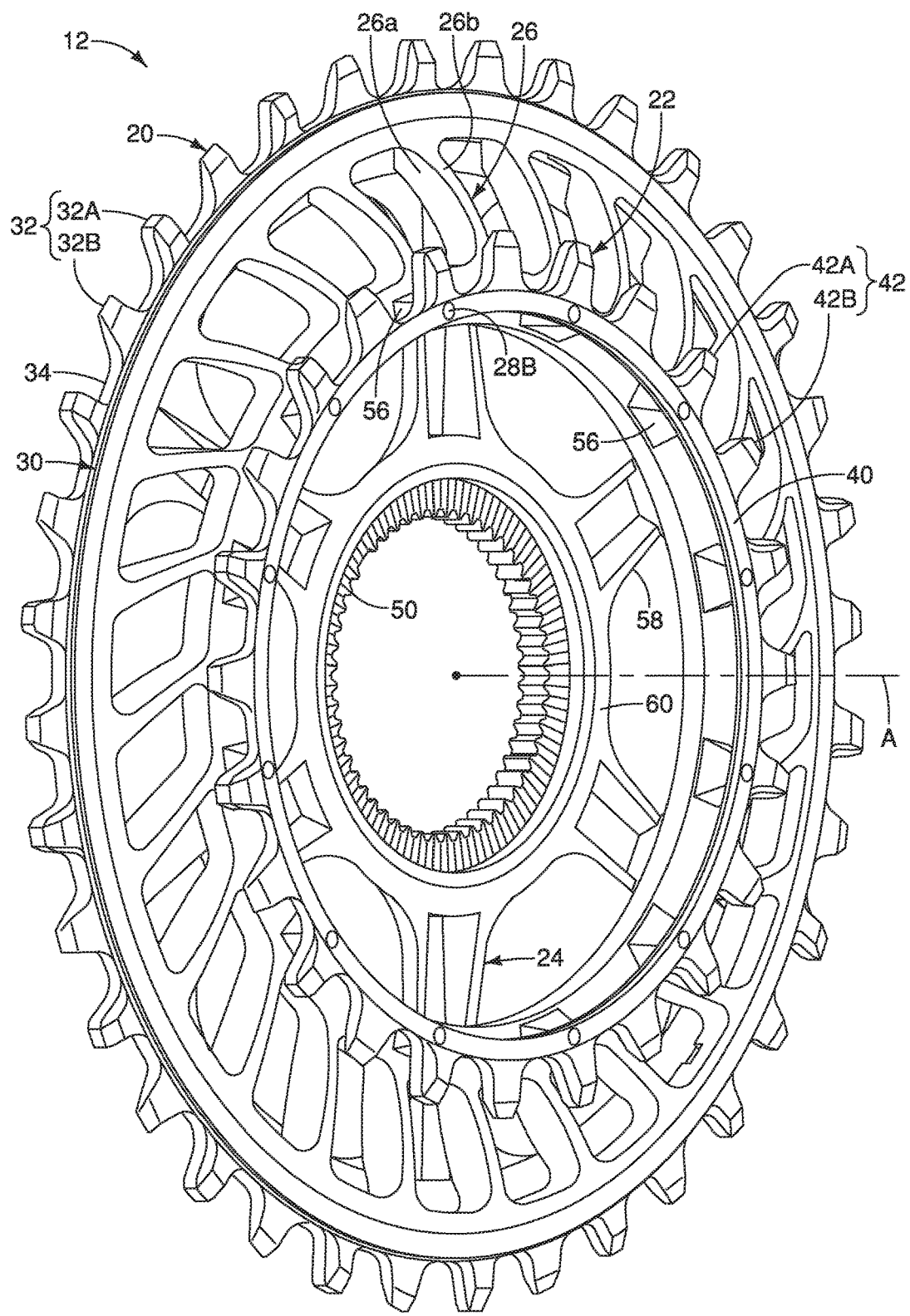
FIG. 4 is an inside perspective view of the bicycle front sprocket assembly illustrated in FIGS. 1 to 3.
Figure 5:
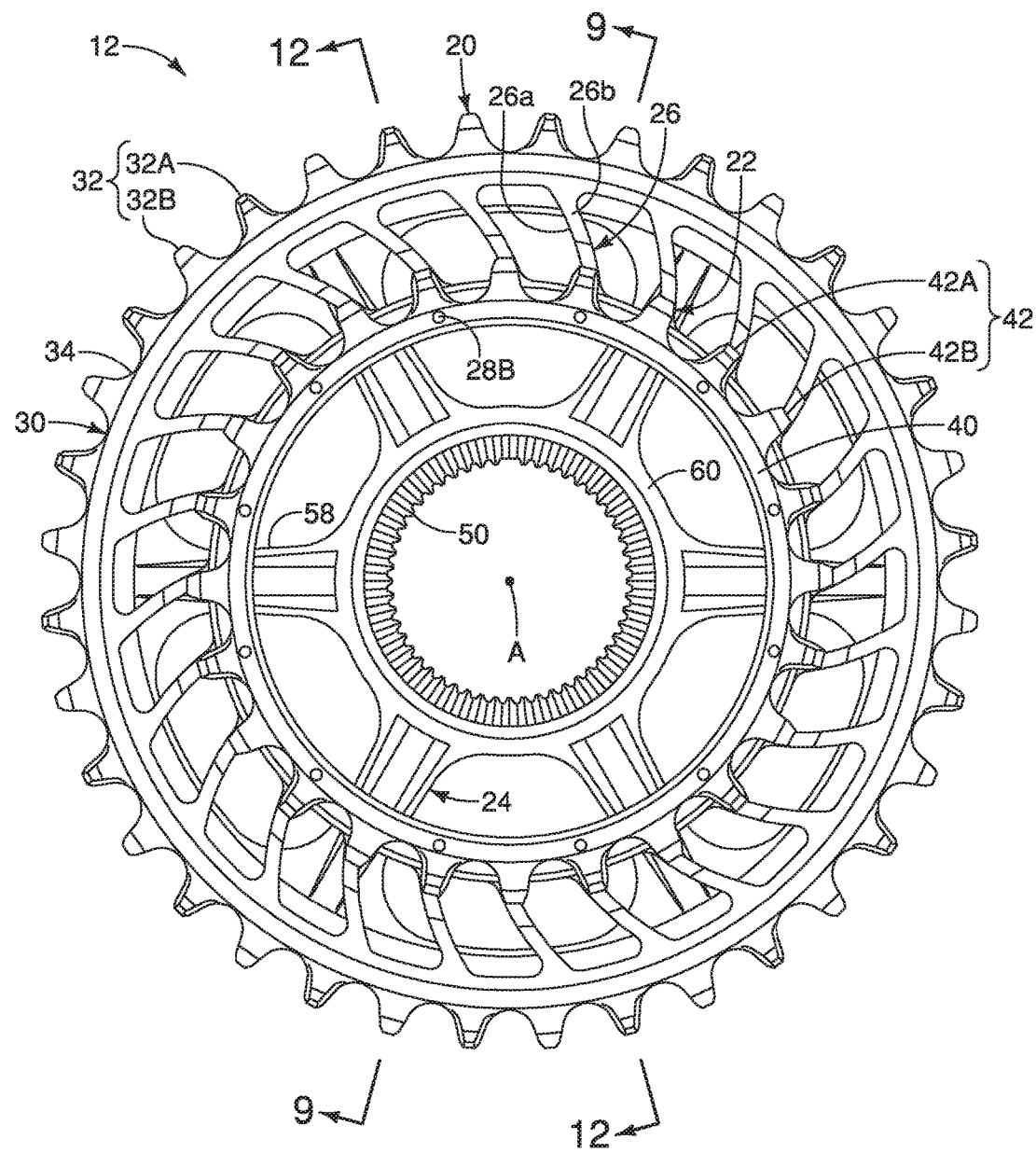
FIG. 5 is an inside elevational view of the bicycle front sprocket assembly illustrated in FIGS. 1 to 4.
Figure 6:
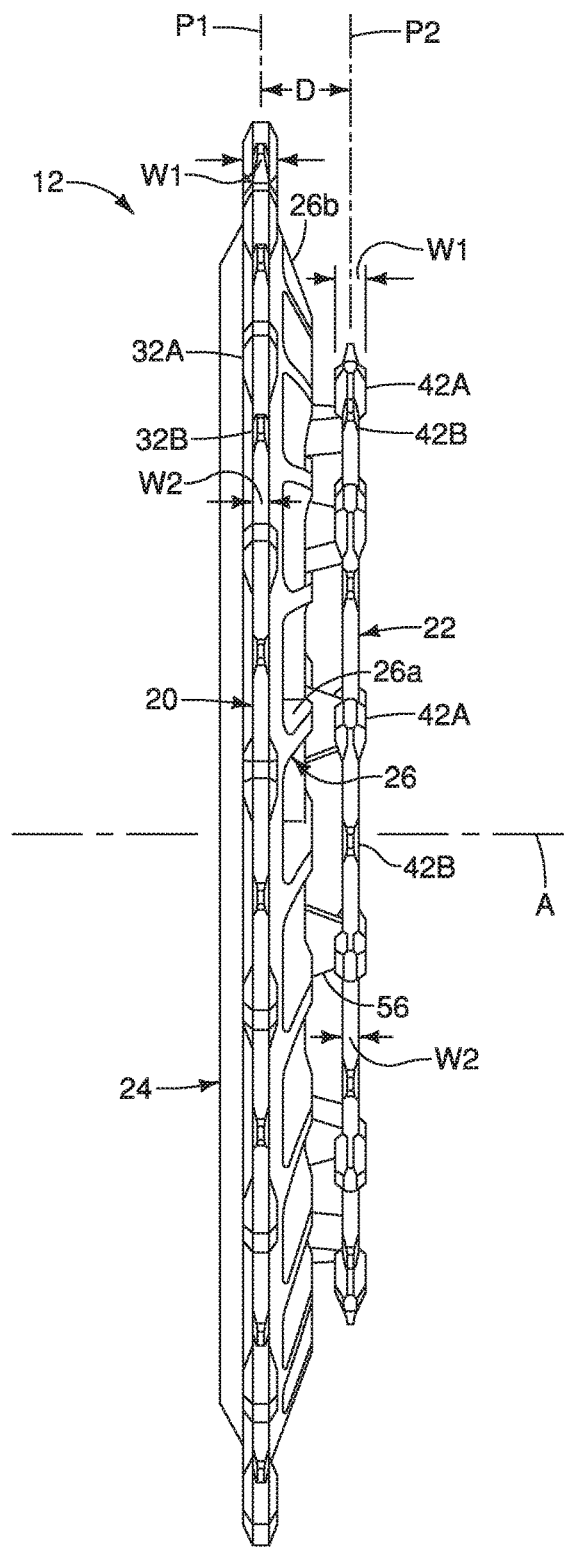
FIG. 6 is an edge elevational view of the bicycle front sprocket assembly illustrated in FIGS. 1 to 5.

As seen in FIGS. 4 to 6, in the first embodiment, the chain guiding portion 26 is positioned between the first sprocket teeth 32 and the second sprocket teeth 42 in an axial direction parallel to a rotational center axis A of the bicycle front sprocket assembly 12. The chain guiding portion 26 is formed by a plurality of ribs 26a extending in a generally radial direction. A radial inner end of each of the ribs 26a is located adjacent an outer periphery of the second sprocket 22. A radial outer end of each of the ribs 26a is located adjacent an outer periphery of the first sprocket 20. Each of the ribs 26a includes a sloping or inclined surface 26b. As seen in FIG. 6, the chain guiding portion 26 has a sloping or inclined surface 26b that approaches the second sprocket 22 as the inclined surface 26b extends radially inward from the outer periphery of the first sprocket 20 towards the outer periphery of the second sprocket 22. In this way, a bicycle chain (not shown) is prevented from dropping in between the first and second sprockets 20 and 22. Further, the chain guiding portion 26 guides the bicycle chain from the second sprocket 22 toward the first sprocket 20 during an outward shifting operation. Preferably, as seen in FIG. 6, the inclined surfaces 26a are located radially inward of the first sprocket teeth 32 and radially outward of the second sprocket teeth 42.

Figure 7:
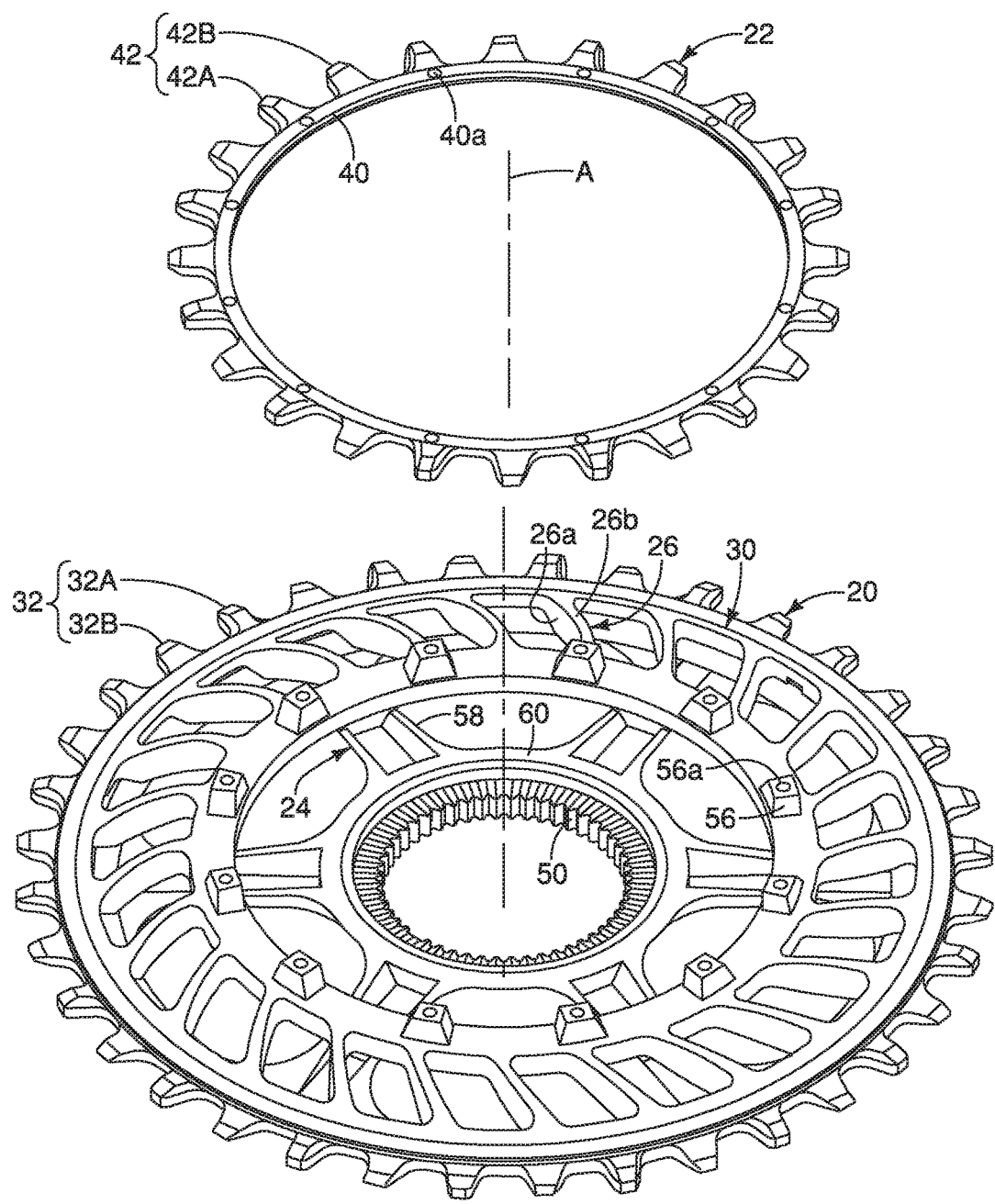
FIG. 7 is a partially exploded perspective view of the bicycle front sprocket assembly illustrated in FIGS. 1 to 6.
Figure 11:
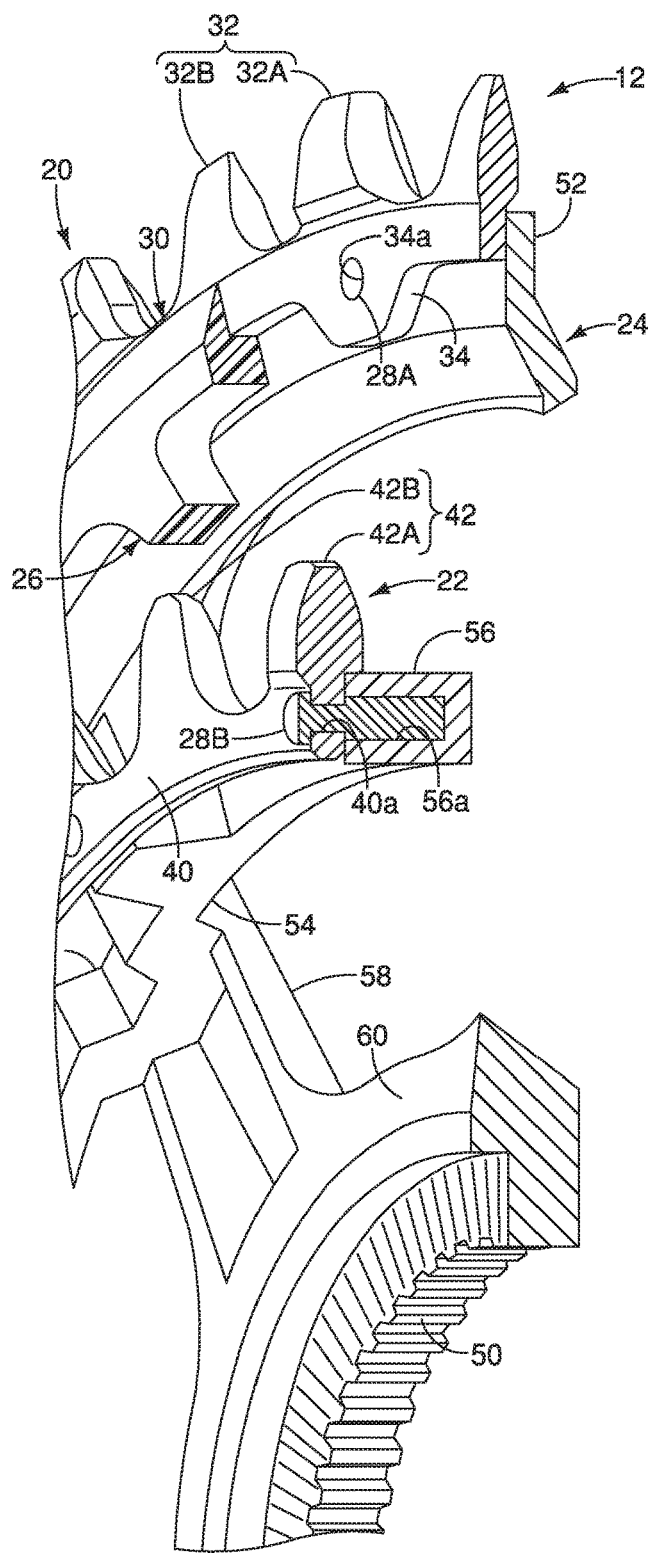
FIG. 11 is an enlarged cross sectional view of a portion of the bicycle front sprocket assembly illustrated in FIG. 9 but shown in perspective.

As seen in FIGS. 7, 11 and 12, the chain guiding portion 26 is an integral part of the first sprocket 20. However, it will be apparent to those skilled in the bicycle field from this disclosure that the chain guiding portion 26 can be a separate member that is attached to either the first sprocket 20 or the sprocket carrier 24, or to both the first sprocket 20 and the sprocket carrier 24. Alternatively, the chain guiding portion 26 can be omitted if needed and/or desired.

While a plurality of the first and second non-threaded fasteners 28A and 28B are illustrated in FIGS. 1 to 8, the bicycle front sprocket assembly 12 is not limited to this construction. Rather, at least one of the first sprocket 20 and the second sprocket 22 is mounted to the sprocket carrier 24 by at least one non-threaded fastener. Preferably, the non-threaded fastener includes a pin non-detachably fastening the at least one of the first sprocket 20 and the second sprocket 22 to the corresponding sprocket mounting portions 52 and/or 54 of the sprocket carrier 24. For a more secure attachment, one or more of the pins (the non-threaded fasteners) can be a rivet such as the non-threaded fastener 28C1 as seen in FIG. 9 or the non-threaded fastener 28C2 as seen in FIG. 12. Alternatively, to simplify manufacturing, one or more of the pins (the non-threaded fasteners) includes a press fitted pin that is press fitted into the first sprocket 20 and the sprocket carrier 24 without swaging an end of the pin. Likewise, the second sprocket 22 can be attached to the sprocket carrier 24 with one or more press fitted pins in which the pin is press fitted into the second sprocket 22 and the sprocket carrier 24 without swaging an end of the pin.

In the first embodiment, the first sprocket 20 and the second sprocket 22 are mounted to the first and second sprocket mounting portions 52 and 54 of the sprocket carrier 24 by a plurality of the first and second non-threaded fasteners 28A and 28B, respectively. Also in the first embodiment, each of the first and second non-threaded fasteners 28A and 28B is a pin that is press-fitted into the sprocket carrier 24 and the first and second sprockets 20 and 22. The first and second non-threaded fasteners 28A and 28B have an enlarged head portion and a shaft portion. The enlarged head portion of the pins (rivet) can be formed by swaging to prevent the pins from being removed from the sprocket carrier 24 and the first and second sprockets 20 and 22. For example, in the case of the pins (the non-threaded fasteners) being rivets such as rivets 28C1 and 28C2 as seen in FIGS. 9 and 12, respectively, both ends have enlarged head portions that are deformed by swaging such that the pins do not need to be inserted by press-fitting manner.

As seen in FIG. 6, each of the first sprocket teeth 32 has a first axial tooth center plane P1. Preferably, the first sprocket teeth 32 include a plurality of outer-link engaging teeth 32A and a plurality of inner-link engaging teeth 32B. The outer-link engaging teeth 32A have a first axial width W1. The inner-link engaging teeth 32B have a second axial width W2. The first axial width W1 of the outer link engaging teeth 32A are larger than the second axial width W2 of the inner link engaging teeth 32B. In particular, the first axial width W1 is dimensioned for engaging with the outer links of a bicycle chain but too large for engaging with the inner links of a bicycle chain. In other words, the first axial width W1 is smaller than an outer link space defined by opposite inner surfaces of a pair of outer link plates of the outer link, and is larger than an inner link space defined by opposite inner surfaces of a pair of inner link plates of the inner link. The second axial width W2 is dimensioned for engaging with the inner links of a bicycle chain. In other words, the second axial width W2 is smaller than the inner link space. As used herein, the first and second axial widths W1 and W2 are maximum axial widths of the outer-link engaging teeth 32A and the inner-link engaging teeth 32B.

Preferably, the first axial widths W1 of the outer-link engaging teeth 32A are in a range from 2.5 mm to 5.4 mm, and more preferably in a range from 3.0 mm to 4.5 mm. When the first axial widths W1 of the outer-link engaging teeth 32A are in such a range, the outer-link engaging teeth 32A can readily engage the outer link plates of a bicycle chain without engaging with the inner link plates of a bicycle chain. The second axial width W2 of the inner link engaging teeth 32B are preferably in a range from 1.5 mm to 2.3 mm. When the second axial widths W2 of the inner link engaging teeth 32B are in such a range, the inner link engaging teeth 32B have the necessary rigidity and readily engage with the inner link plates of a bicycle chain. The outer-link engaging teeth 32A are preferably formed into a "+" (plus) shape as seen from the radially outer side, as shown in FIG. 6. The inner link engaging teeth 32B are preferably formed into a "−" (minus) shape as seen from the radially outer side. The outer-link engaging teeth 32A and the inner link engaging teeth 32B taper so as to gradually decrease in axial width toward the radially outer side. In this way, the outer-link engaging teeth 32A and the inner link engaging teeth 32B thereby engage more readily with the outer link plates and the inner link plates of a bicycle chain. In the first embodiment, the outer-link engaging teeth 32A are identical to the inner link engaging teeth 32B in terms of height in the radial direction.

Each of the second sprocket teeth 42 has a second axial tooth center plane P2. The second sprocket teeth 42 are made of a metallic material and attached to the sprocket carrier 24 by the non-threaded fastener 28B. Preferably, the second sprocket teeth 42 include a plurality of outer-link engaging teeth 42A and a plurality of inner-link engaging teeth 42B. The outer-link engaging teeth 42A have the first axial width W1. The inner-link engaging teeth 42B have the second axial width W2. Thus, the first axial width W1 of the outer link engaging tooth 42A is larger than the second axial width W2 of the inner link engaging tooth 42B. In the first embodiment, the outer-link engaging teeth 42A are identical to the outer-link engaging teeth 32A, and the inner-link engaging teeth 42B are identical to the inner link engaging teeth 32B. Thus, the descriptions of the outer-link engaging teeth 32A and the inner link engaging teeth 32B applies to the outer-link engaging teeth 42A and the inner link engaging tooth 42B.

While the first sprocket teeth 32 includes a plurality of the outer-link engaging teeth 32A and a plurality of the inner-link engaging teeth 32B, the bicycle front sprocket assembly 12 is not limited to this construction. Also while the second sprocket teeth 42 includes a plurality of the outer-link engaging teeth 42A and a plurality of the inner-link engaging teeth 42B, the bicycle front sprocket assembly 12 is not limited to this construction. Rather, at least one of the first sprocket teeth 32 and the second sprocket teeth 42 includes at least one outer-link engaging tooth having the first axial width W1 and at least one inner-link engaging tooth having a second axial width W2. However, more preferably, each of the first and second sprocket teeth 32 and 42 includes the at least one outer-link engaging tooth and the at least one inner-link engaging tooth. Even more preferably, the at least one outer-link engaging tooth of each of the first and second sprocket teeth 32 and 42 includes a plurality of outer-link engaging teeth, and the at least one inner-link engaging tooth of each of the first and second sprocket teeth 32 and 42 includes a plurality of inner-link engaging teeth.

As seen in FIGS. 2 to 6, the first and second sprockets 20 and 22 are coupled together by the sprocket carrier 24, which can be configured to be mounted on one of the crank arm 14 and the crankshaft 16. In the illustrated embodiment, the sprocket carrier 24 is a separate member from both of the first and second sprockets 20 and 22. The sprocket carrier 24 is axially positioned between the first sprocket 20 and the second sprocket 22 in the axial direction. Preferably, as seen in FIG. 6, a maximum axial distance D defined between the first axial tooth center plane P1 and the second axial tooth center plane P2 in an axial direction parallel to a rotational center axis A of the bicycle front sprocket assembly 12 is smaller than or equal to 9.5 mm. Also preferably, as seen in FIG. 6, the maximum axial distance D defined between the first axial tooth center plane P1 and the second axial tooth center plane P2 in the axial direction is larger than or equal to 7.0 mm. The maximum axial distance D is also referred to as a maximum gear pitch between the first and second sprockets 20 and 22.

As seen in FIGS. 2 to 6, the sprocket carrier 24 basically includes a torque transmitting profile 50 and a first sprocket mounting portion 52. Here, in the first embodiment, the torque transmitting profile 50 includes a plurality of splines or serrations that are configured to engage a mounting boss 14a (FIG. 1) of the bicycle crank arm 14 in a state where the sprocket carrier 24 is mounted to the bicycle crank arm 14. Thus, the mounting boss 14a has a mating torque transmitting profile including a plurality of splines or serrations for engaging the torque transmitting profile 50. Alternatively, the torque transmitting profile can include a fastener, such as a bolt to fix the sprocket carrier 24 to the crank arm 14. The fastener transmits a torque from the bicycle crank arm 14 to the sprocket carrier 24. In such a configuration the plurality of splines or serrations is not needed. The rotational center axis A of the bicycle crank arm 14 passes through the mounting boss 14a. The sprocket carrier 24 further includes a second sprocket mounting portion 54 for supporting the second sprocket 22. As seen in FIG. 8, the second sprocket mounting portion 54 is a ring shaped portion that is provided with a plurality of axial protuberances 56. Thus, the axial protuberances 56 are integrally formed with the sprocket carrier 24. The sprocket carrier 24 further includes a plurality of arms 58 interconnecting the first and second sprocket mounting portions 52 and 54. The arms 58 also interconnects the first and second sprocket mounting portions 52 and 54 with the torque transmitting profile 50. The inner ends of the arms 58 are connected by a crank arm mounting portion 60 that includes the torque transmitting profile 50.

Here, in the first embodiment, the sprocket carrier 24 is a direct mount carrier that is configured to be directly mounted on the mounting boss 14a of the crank arm 14 and supports both of the first and second sprockets 20 and 22. However, alternatively, the first and second sprockets 20 and 22 can be attached to the crank arm 14 with separate sprocket carriers. Further, the sprocket carrier 24 can be configured to be mounted on mounting arms radially extending from the rotational center axis A of the crank arm 14 via fixing bolts and nuts. Accordingly, the term "sprocket carrier" as used herein includes a sprocket support member for one or more sprockets. For example, the term "sprocket carrier" as used herein with respect to the first embodiment includes at least one sprocket mounting portion (e.g., the second sprocket mounting portion 54 with the axial protuberances 56) and the other parts (e.g., the inner ends of the arms 58 and the crank arm mounting portion 60) that are disposed radially inward of the sprocket mounting portion (e.g., the second sprocket mounting portion 54 with the axial protuberances 56).

As seen in FIGS. 9 to 12, both of the first and second sprockets 20 and 22 are attached to the sprocket carrier 24 using non-threaded fasteners such as the non-threaded fasteners 28A and 28B. In the first embodiment, as seen in FIGS. 11 and 12, the non-threaded fasteners 28A are press fitted into bores 52a of the first sprocket mounting portion 52 of the sprocket carrier 24 and then press fitted into bores 34a of the attachment portion 34 of the first sprocket 20. The non-threaded fasteners 28A have a shaft portion with a cross sectional dimension that is slightly larger than the dimension of the bores 34a and 52a to create an interference fit therebetween. In this way, the first sprocket 20 is secured to the sprocket carrier 24. Thus, the non-threaded fasteners 28A are press-fitted pins that are press fitted into the bores 34a and 52a. In the first embodiment, as seen in FIGS. 11 and 12, the non-threaded fasteners 28A are also deformed to form an enlarged head portion. Thus, the non-threaded fasteners 28A are rivets that secure the first sprocket 20 to the sprocket carrier 24. However, the non-threaded fasteners 28A can just be formed as press-fitted pins without the head portion as needed and/or desired.

Figure 10:
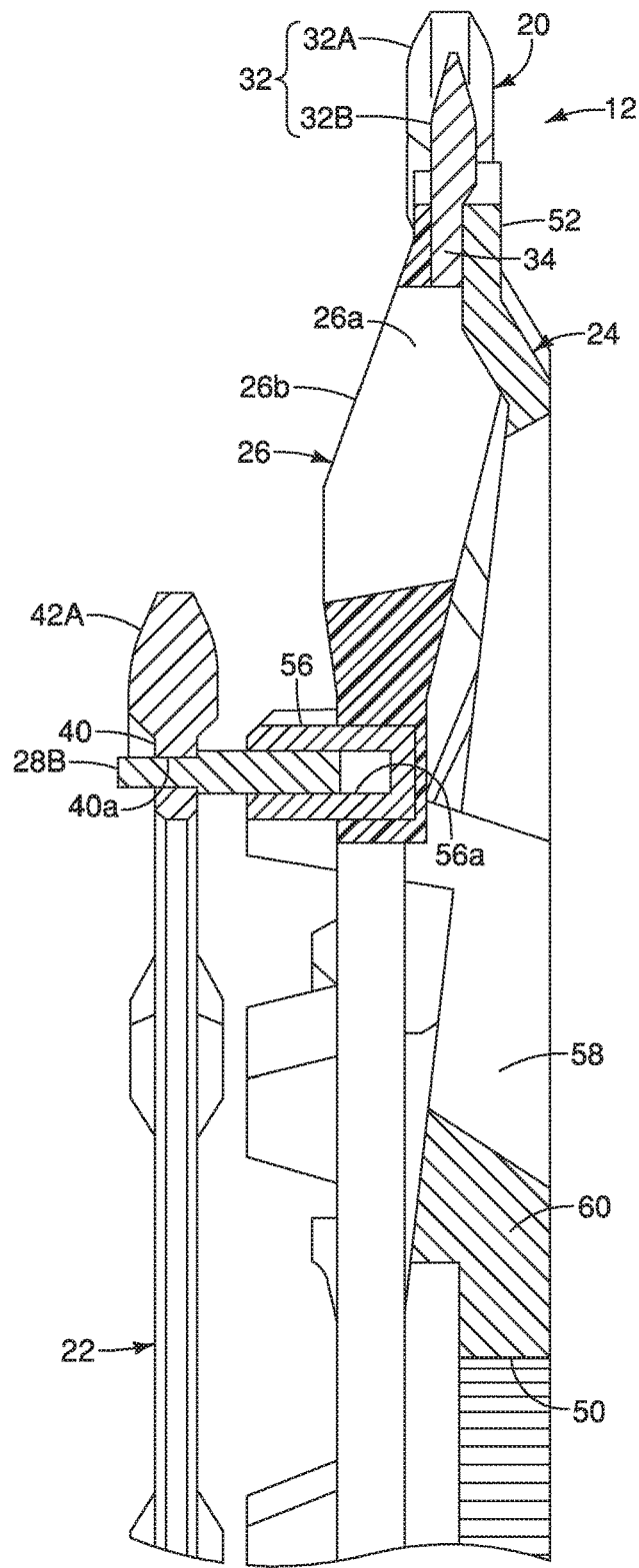
FIG. 10 is an enlarged cross sectional view of a portion of the bicycle front sprocket assembly illustrated in FIG. 9, but prior to deformation of the non-threaded fasteners to securely fix the second sprocket to the sprocket carrier.

Referring to FIGS. 9 to 11, the attachment of the second sprocket 22 to the sprocket carrier 24 will now be discussed. FIG. 10 illustrates a partially assembled state, while FIGS. 9 and 11 illustrate a fully assembled state. Basically, the second sprocket 22 is secured to the sprocket carrier 24 using the non-threaded fasteners 28B. The non-threaded fasteners 28B extend into the axial protuberances 56. As seen in FIG. 10, first shaft portions of the non-threaded fasteners 28B are press fitted into bores 56a of the axial protuberances 56 of the sprocket carrier 24. The first shaft portions of the non-threaded fasteners 28B have cross sectional dimensions that are slightly larger than the dimension of the bores 56a to create an interference fit therebetween. In this way, the non-threaded fasteners 28B are secured to the sprocket carrier 24. Next, the second sprocket 22 is installed on second shaft portions of the non-threaded fasteners 28B by first inserting the second shaft portions of the non-threaded fasteners 28B into openings 40a of the second sprocket body 40 of the second sprocket 22, and then deforming the free ends of the second shaft portions of the non-threaded fasteners 28B to form enlarged head portions. As a result, the non-threaded fasteners 28B are rivets for securing the second sprocket 22 to the sprocket carrier 24.

While the sprocket carrier 24 includes a plurality of the axial protuberance 56 for securing the second sprocket 22 to the sprocket carrier 24, the bicycle front sprocket assembly 12 is not limited to this construction. Rather, at least one of the first and second sprockets 20 and 22 and the sprocket carrier 24 has an axial protuberance integrally formed therewith as a unitary one-piece member so as to be positioned between the sprocket carrier 24 and one of the first sprocket 20 and the second sprocket 22 in an axial direction parallel to a rotational center axis A of the bicycle front sprocket assembly 12. The one of the first sprocket 20 and the second sprocket 22 is mounted to the sprocket carrier 24 by a non-threaded fastener extending into the axial protuberance.

Also while only the second sprocket 22 is secured to the sprocket carrier 24 via the rivets as the non-threaded fasteners 28B, the bicycle front sprocket assembly 12 is not limited to this construction. Rather, at least one of the first sprocket 20 and the second sprocket 22 is mounted to the corresponding sprocket mounting portions 52 and/or 54 of the sprocket carrier 24 by other types of non-threaded fasteners. The at least one of the first sprocket 20 and the second sprocket 22 is mounted to the corresponding sprocket mounting portions 52 and/or 54 of the sprocket carrier 24 by a plurality of the non-threaded fasteners 28B.

Figure 13:
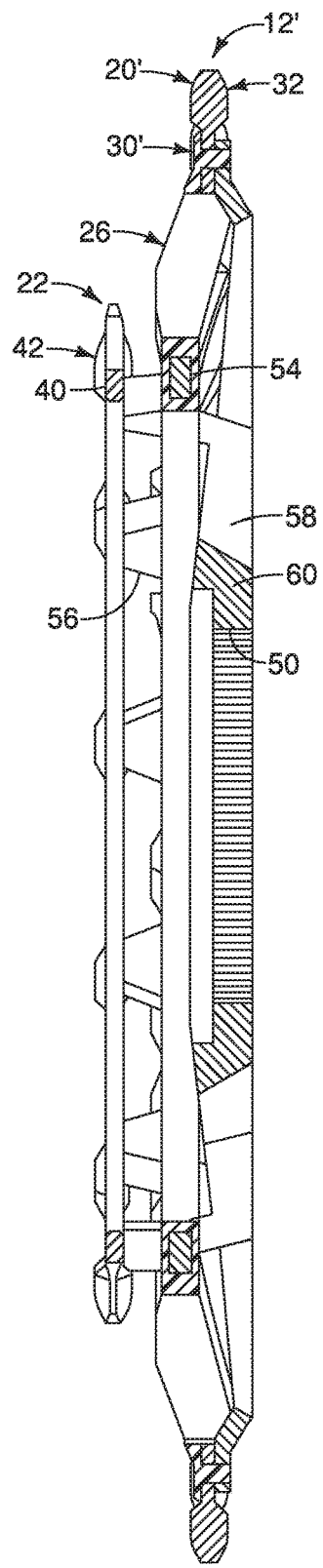
FIG. 13 is a cross sectional view of a bicycle front sprocket assembly in accordance with a second embodiment.
Figure 14:
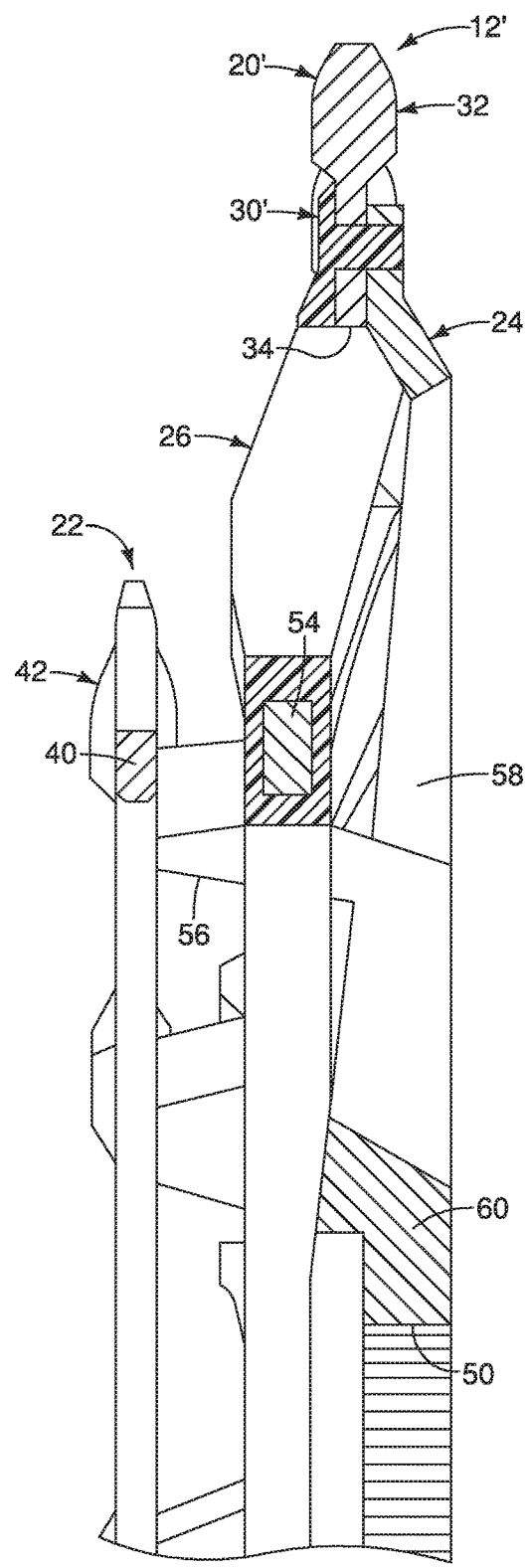
FIG. 14 is an enlarged cross sectional view of an upper portion of the bicycle front sprocket assembly illustrated in FIG. 13.

Referring now to FIGS. 13 and 14, a bicycle front sprocket assembly 12' is illustrated in accordance with a second embodiment. In the second embodiment, the bicycle front sprocket assembly 12' comprises a first sprocket 20', and further comprises the second sprocket 22 and the sprocket carrier 24 of the first embodiment. Here, the first sprocket 20' is identical to the first sprocket 20 as discussed above, except that the attachment of the first sprocket 20' to the sprocket carrier 24 has been changed. Thus, the parts of the first and second embodiments that are identical will be given the same reference numerals and will not be discussed again with respect to the second embodiment. The first sprocket 20' includes a chain guiding portion 26 that is identical to the first embodiment as discussed above. The first sprocket 20' also includes a first sprocket body 30' and a plurality of first sprocket teeth 32. The first sprocket teeth 32 are identical to the first sprocket teeth 32 of the first embodiment as discussed above. The first sprocket body 30' is identical to the first sprocket body 30 of the first embodiment, as discussed above, expect for the attachment of the first sprocket body 30' to the sprocket mounting portion 52 of the sprocket carrier 24.

In the second embodiment, the sprocket carrier 24 is integrally molded to the first sprocket teeth 32 by the first sprocket body 30' instead of using the first non-threaded fasteners 28A. In particular, the non-metallic material of the first sprocket body 30' extends into the openings 34a of the attachment portion 34 and into the openings 52a of the sprocket carrier 24. Since the attachment of first sprocket 20' to the sprocket carrier 24 is the only difference in the second embodiment from the first embodiment, the description of the second embodiment will be limited to the difference of the second embodiment from the first embodiment.

Figure 15:
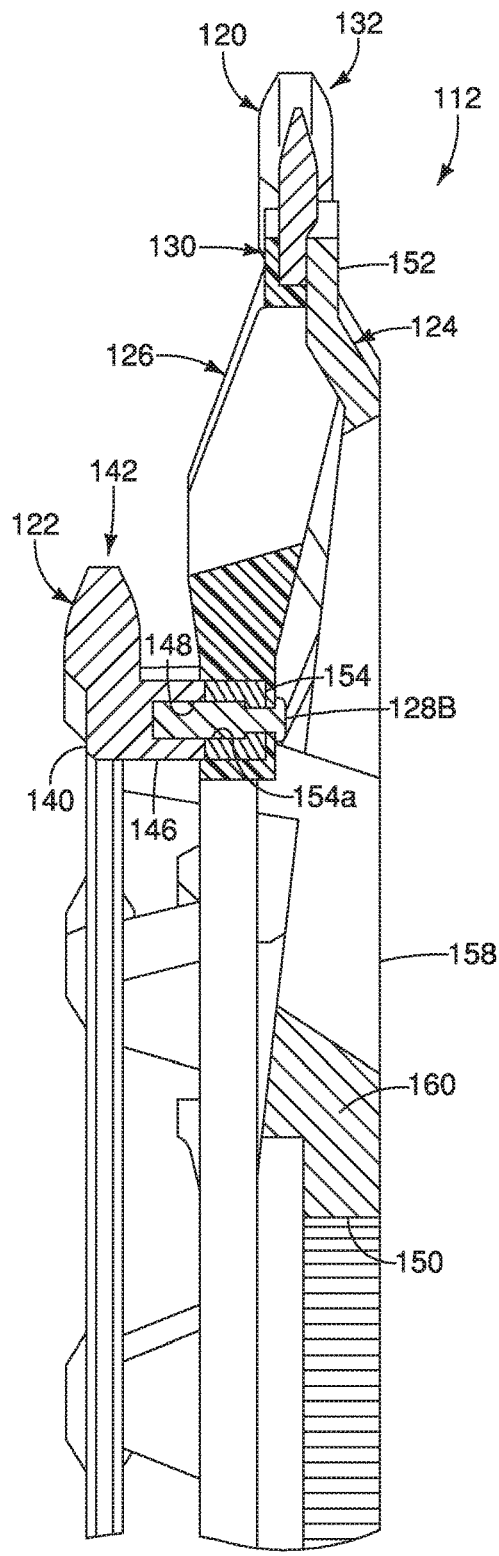
FIG. 15 is a cross sectional view, similar to an upper portion of FIG. 9, of a portion of a bicycle front sprocket assembly in accordance with a third embodiment.

Referring now to FIG. 15, a bicycle front sprocket assembly 112 is illustrated in accordance with a third embodiment. In the third embodiment, the bicycle front sprocket assembly 112 comprises a first sprocket 120, a second sprocket 122 and a sprocket carrier 124. The first sprocket 120 is identical to the first sprocket 20 of the first embodiment, and includes a chain guiding portion 126 that is identical to the chain guiding portion 26, discussed above. Thus, the first sprocket 120 also includes a first sprocket body 130 and a plurality of first sprocket teeth 132. The second sprocket 122 includes a second sprocket body 140 and a plurality of second sprocket teeth 142. The sprocket carrier 124 further includes a torque transmitting profile 150, a first sprocket mounting portion 152 and a second sprocket mounting portion 154. The torque transmitting profile 150, the first sprocket mounting portion 152 and the second sprocket mounting portion 154 are connected by a plurality of arms 158 in the same manner as the first embodiment. Thus, the sprocket carrier 124 further includes a crank arm mounting portion 160 that includes the torque transmitting profile 150. Basically, the bicycle front sprocket assembly 112 only differs from the bicycle front sprocket assembly 12 in the attachment of the second sprocket 122 to the sprocket carrier 124.

In the third embodiment, the second sprocket 122 is attached to the sprocket carrier 124 by a plurality of non-threaded fasteners 128B in the form of press-fitted pins that are deformed to form an enlarged head portion. However, here, the second sprocket body 140 of the second sprocket 122 is provided with a plurality of axial protuberances 146 for receiving the non-threaded fasteners 128B. Thus, each of the axial protuberances 146 has a bore 148 for receiving the non-threaded fasteners 128B. Also the second sprocket mounting portion 154 includes a plurality of openings 154a corresponding to the bores 148 for receiving the non-threaded fasteners 128B. Similar to the first embodiment, the non-threaded fasteners 128B are press-fitted pins that are press fitted into the bores 148 and then are deformed to form an enlarged head portion.

Since the attachment of the second sprocket 122 to the sprocket carrier 124 is the only difference in the third embodiment from the first embodiment, the descriptions of the parts of the third embodiment that are identical to the parts of the first embodiment will be omitted for the sake of brevity.

Figure 16:
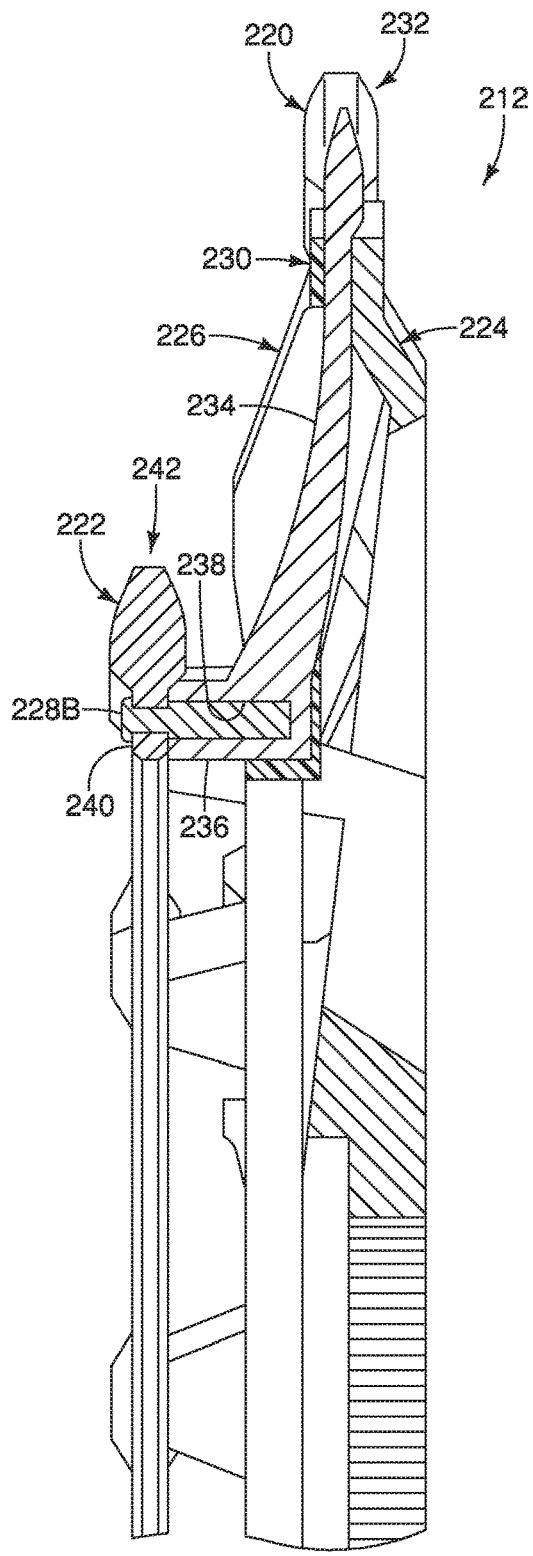
FIG. 16 is a cross sectional view, similar to an upper portion of FIG. 9, of a portion of a bicycle front sprocket assembly in accordance with a fourth embodiment.

Referring now to FIG. 16, a bicycle front sprocket assembly 212 is illustrated in accordance with a fourth embodiment. In the fourth embodiment, the bicycle front sprocket assembly 212 comprises a first sprocket 220, a second sprocket 222 and a sprocket carrier 224. The second sprocket 222 is identical to the second sprocket 22 of the first embodiment, and thus, the second sprocket 222 includes a second sprocket body 240 and a plurality of second sprocket teeth 242. The first sprocket 220 includes a chain guiding portion 226 that is identical to the chain guiding portion 26, discussed above. The first sprocket 220 also includes a first sprocket body 230 and a plurality of first sprocket teeth 232. However, unlike the first embodiment, the first sprocket body 230 includes an attachment portion 234 with a plurality of axial protuberances 236 for attaching the second sprocket 222 directly to the first sprocket 220. Thus, the bicycle front sprocket assembly 212 only differs from the bicycle front sprocket assembly 12 in the manner that the second sprocket 222 is supported by the sprocket carrier 224.

In the fourth embodiment, the second sprocket 222 is not directly attached to the sprocket carrier 224, but rather attached to the first sprocket 220, which is attached to the sprocket carrier 224. Thus, in the illustrated embodiment, the first sprocket 220 is regarded as a part of the sprocket carrier of the present invention. While the first sprocket 220 and the sprocket carrier 224 are formed as separated members from each other, they can be integrally formed with each other. Here, as mentioned above, the first sprocket 220 is provided with the axial protuberances 236 for receiving the non-threaded fasteners 228B. Thus, each of the axial protuberances 236 has a bore 238 for receiving the non-threaded fasteners 228B. In this way, the second sprocket 222 is directly attached to the first sprocket 220. Similar to the first embodiment, the non-threaded fasteners 228B are press-fitted pins that are deformed to form an enlarged head portion.

Since the manner in which the second sprocket 222 is supported by the sprocket carrier 224 is the only difference in the fourth embodiment from the first embodiment, the descriptions of the parts of the fourth embodiment that are identical to the parts of the first embodiment will be omitted for the sake of brevity.

Figure 17:
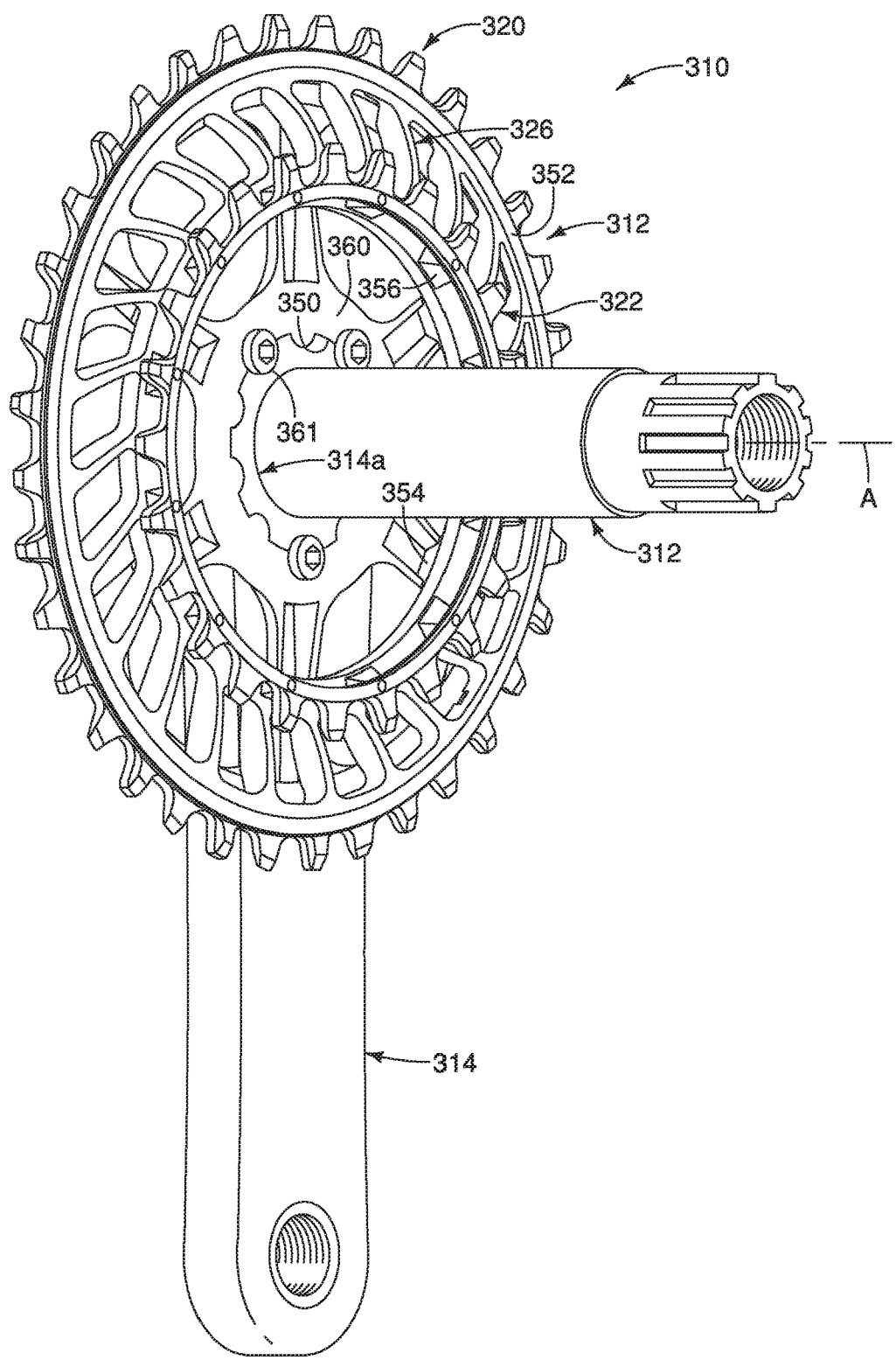
FIG. 17 is an inside perspective view of a bicycle crank assembly having a bicycle front sprocket assembly configured in accordance with a fifth embodiment.

Referring now to FIG. 17, a bicycle crank assembly 310 according to a fifth embodiment is illustrated. In the fifth embodiment, the bicycle crank assembly 310 basically comprises a bicycle front sprocket assembly 312, a crank arm 314 and a crankshaft 316. The bicycle front sprocket assembly 312 comprises a first sprocket 320, a second sprocket 322 and a sprocket carrier 324. The first and second sprockets 320 and 322 are identical to the first and second sprockets 20 and 22 of the first embodiment. Thus, the first sprocket 320 includes a chain guiding portion 326 that is identical to the chain guiding portion 26, discussed above. However, the sprocket carrier 324 has been modified slightly to illustrate another mounting arrangement of the sprocket carrier 324 to the crank arm 314.

Thus, the bicycle front sprocket assembly 312 only differs from the bicycle front sprocket assembly 12 in the attachment of the sprocket carrier 324 to the crank arm 314. In the fifth embodiment, the sprocket carrier 324 basically includes a torque transmitting profile 350 and a first sprocket mounting portion 352. Similar to the first embodiment, the sprocket carrier 324 also includes a second sprocket mounting portion 354 with a plurality of axial protuberances 356. Here the sprocket carrier 324 further includes a crank arm mounting portion 360 that includes the torque transmitting profile 350. The torque transmitting profile 350 of the crank arm mounting portion 360 includes a plurality of splines that are configured to engage a mounting boss 314a of the bicycle crank arm 314 in a state where the sprocket carrier 324 is mounted to the bicycle crank arm 314. The rotational center axis A of the bicycle crank arm 314 passes through the mounting boss 314a. The bicycle front sprocket assembly 312 is retained on the bicycle crank arm 314 by a plurality of fixing bolts 361. Instead of the splines, the fixing bolts 361 can be the transmitting profile. Further, instead of the fixing bolts, a threaded lock-ring (nut) can fixedly attach the bicycle front sprocket assembly to the bicycle crank arm by threadedly engaging with the mounting boss of the crank arm.

Since the attachment of the sprocket carrier 324 to the crank arm 314 is the only difference in the fifth embodiment from the first embodiment, the descriptions of the parts of the fifth embodiment that are identical to the parts of the first embodiment will be omitted for the sake of brevity.

Referring now to FIGS. 18 to 21, a bicycle front sprocket assembly 412 is illustrated in accordance with a sixth embodiment. In the sixth embodiment, the bicycle front sprocket assembly 412 comprises a first sprocket 420, a second sprocket 422 and a sprocket carrier 424. The first sprocket 420 is a composite gear including a non-metallic part and a metallic part as discussed below. The bicycle front sprocket assembly 412 further comprises a chain guiding portion 426. Similar to the prior embodiments, the chain guiding portion 426 is a provided on the non-metallic part of the first sprocket 420. In view of the similarity between the sixth embodiment and the prior embodiments, the features of the sixth embodiment that are identical or nearly identical will not be discussed herein for the sake of brevity.

Basically, the first sprocket 420 includes a first sprocket body 430 and a plurality of first sprocket teeth 432. The first sprocket 420 also includes an attachment portion 434 for interconnecting the sprocket carrier 424 and the first sprocket teeth 432. As mentioned above, the first sprocket body 430 is at least partly made of a non-metallic material that includes the chain guiding portion 426. Here, the first sprocket body 430 is a made of a non-metallic material such as a resin material or a fiber reinforced resin material. The first sprocket teeth 432 are disposed on a first outer periphery of the first sprocket body 430. The first sprocket body 430 is molded over the sprocket carrier 424 such that the first sprocket 420 and the sprocket carrier 424 are integrally connected (i.e., non-detachably connected without breaking the connection therebetween). The first sprocket teeth 432 are the same as the first sprocket teeth 32 of the first embodiment, and thus, the first sprocket teeth 432 include alternating outer-link engaging teeth and inner-link engaging teeth.

Basically, the second sprocket 422 includes a second sprocket body 440 and a plurality of second sprocket teeth 442. The second sprocket teeth 442 are disposed on a second outer periphery of the second sprocket body 440. Here, the second sprocket body 440 and the plurality of second sprocket teeth 442 are formed as a one-piece member. The second sprocket teeth 442 are the same as the second sprocket teeth 42 of the first embodiment, and thus, the second sprocket teeth 442 include alternating outer-link engaging teeth and inner-link engaging teeth.

Here, the sprocket carrier 424 is integrally provided with the first sprocket 420. However, the sprocket carrier 424 can be integrally provided with one or both of the first sprocket 420 and the second sprocket 422. The sprocket carrier 424 basically includes a torque transmitting profile 450 and a sprocket mounting portion 452. Here, the torque transmitting profile 450 is the same as the torque transmitting profile 50 of the first embodiment. Thus, the sprocket carrier 424 is configured to be mounted to the bicycle crank arm 14 in the same manner as the first embodiment. In particular, the torque transmitting profile 450 is configured to engage the mounting boss 14a of the bicycle crank arm 14 in the same manner as the first embodiment.

Figure 18:
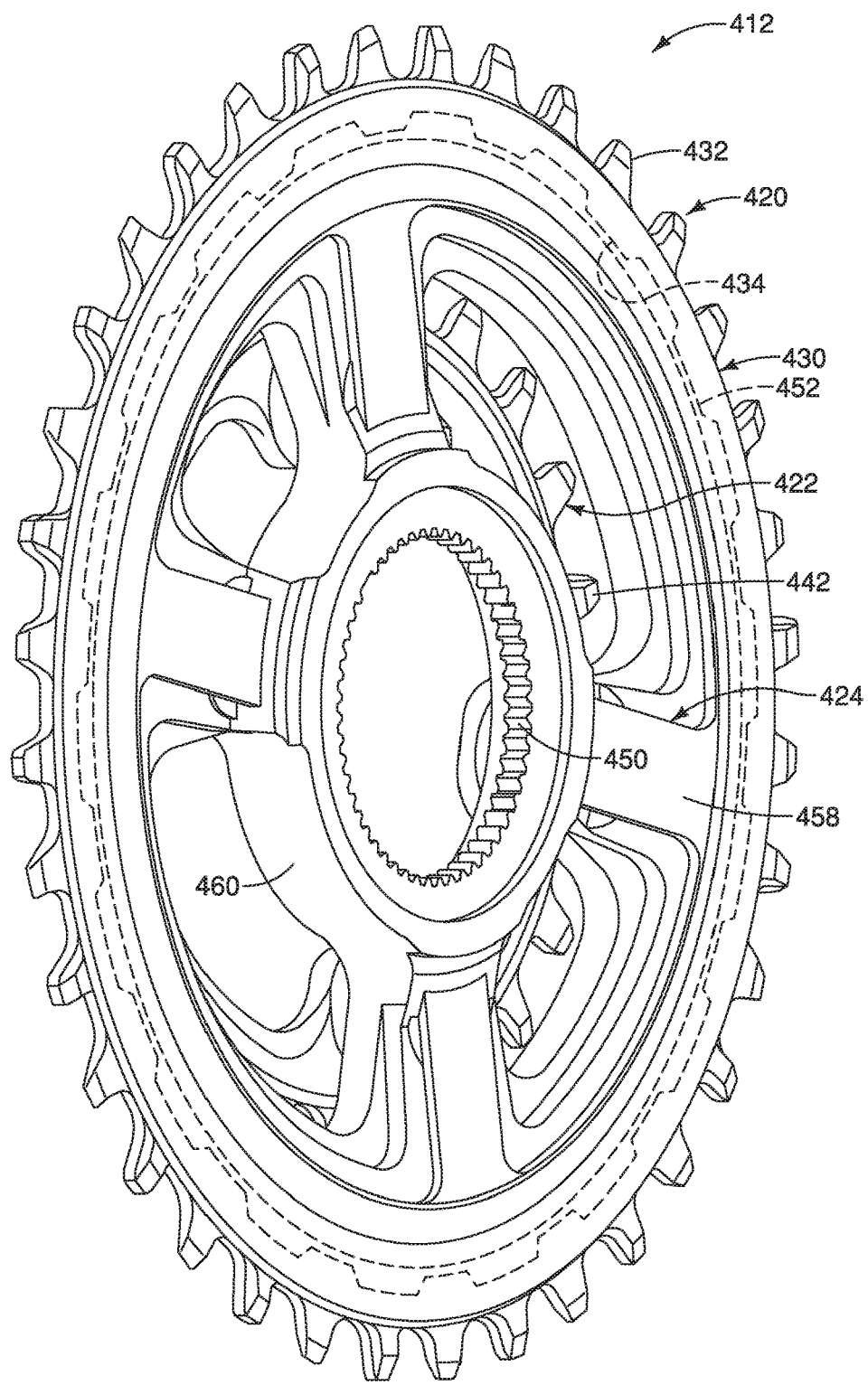
FIG. 18 is a perspective view of a portion of a bicycle front sprocket assembly in accordance with a sixth embodiment.
Figure 19:
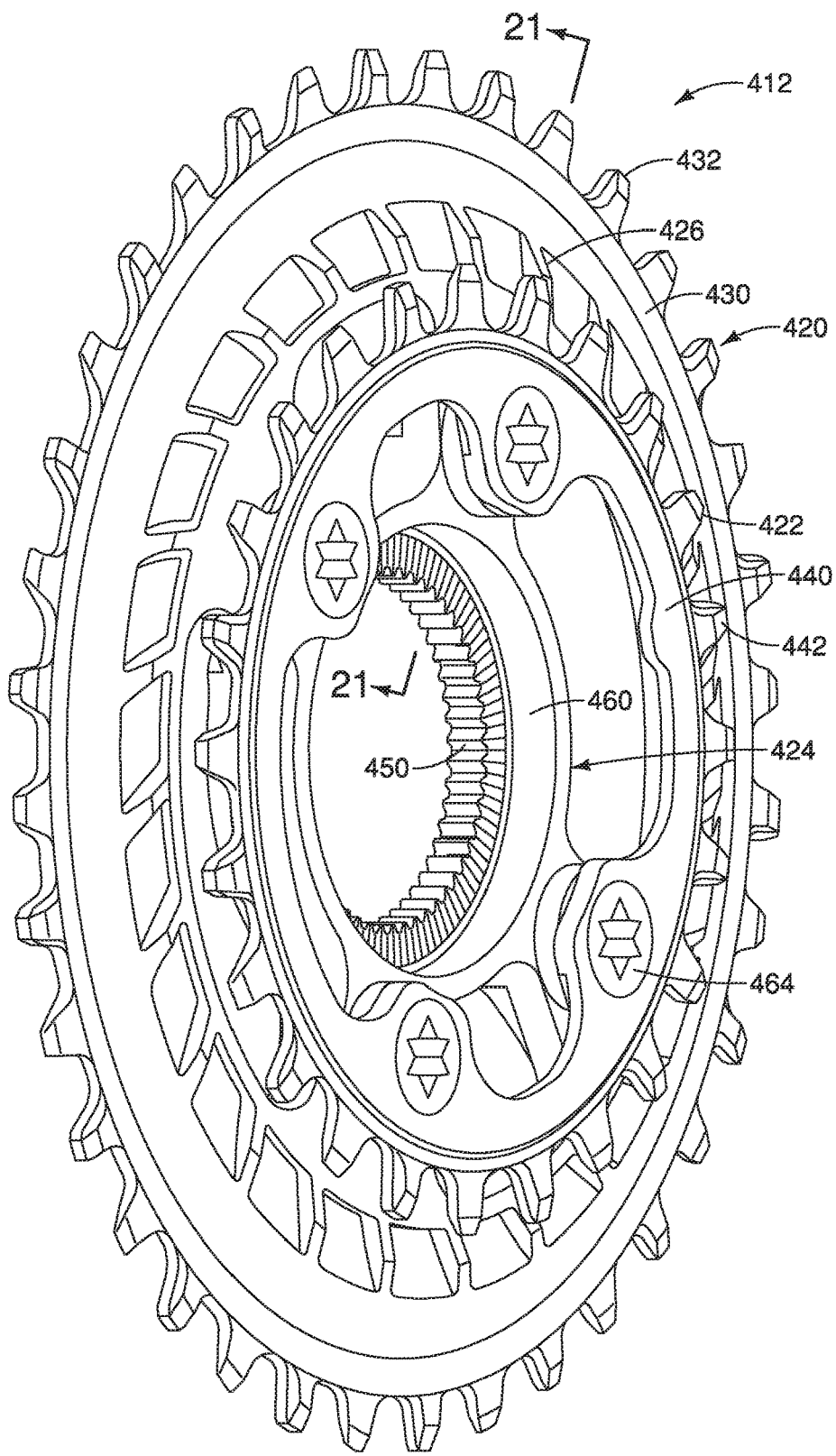
FIG. 19 is an inside perspective view of the bicycle front sprocket assembly illustrated in FIG. 18.
Figure 20:
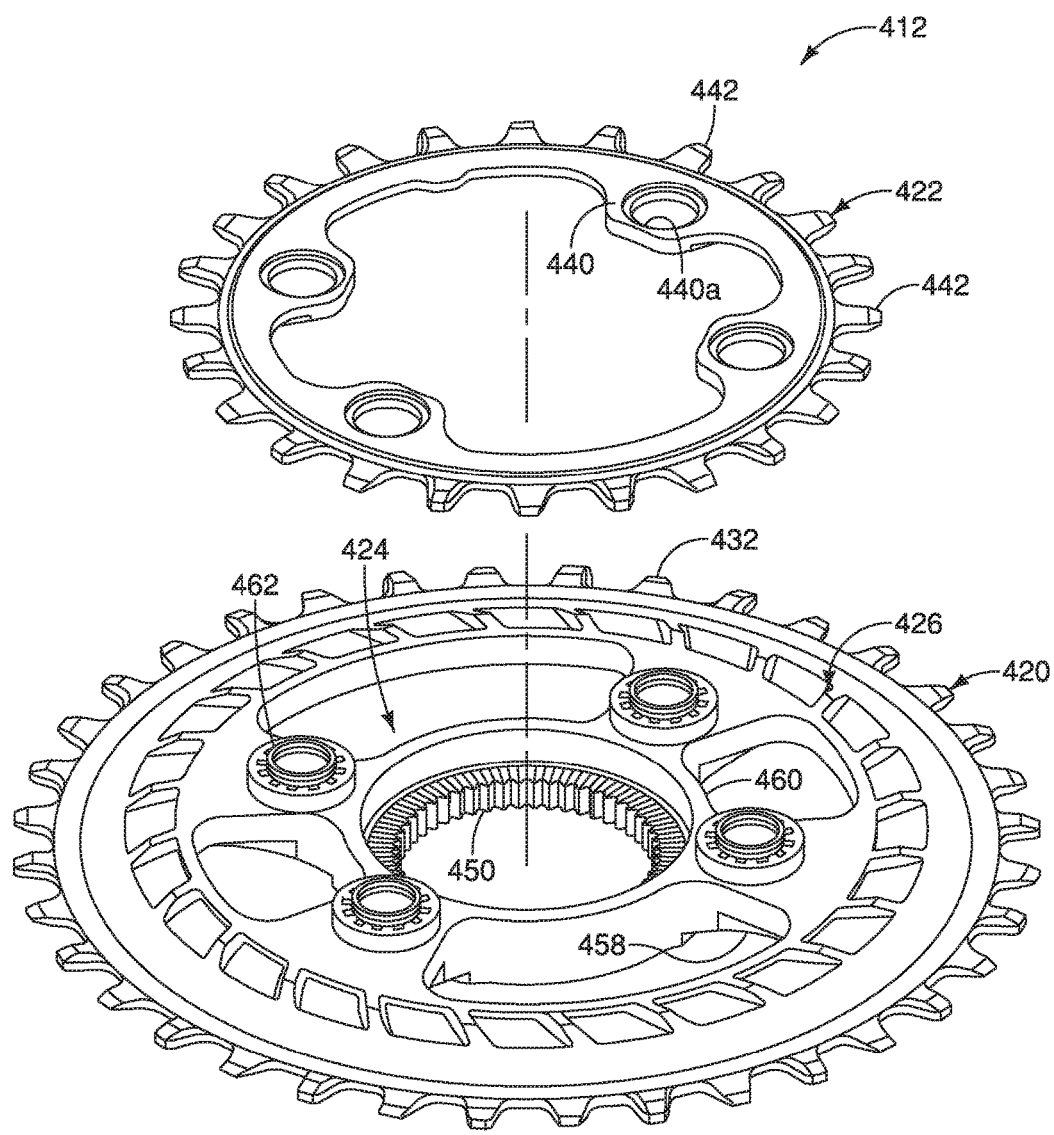
FIG. 20 is a partially exploded perspective view of the bicycle front sprocket assembly illustrated in FIGS. 18 and 19.
Figure 21:
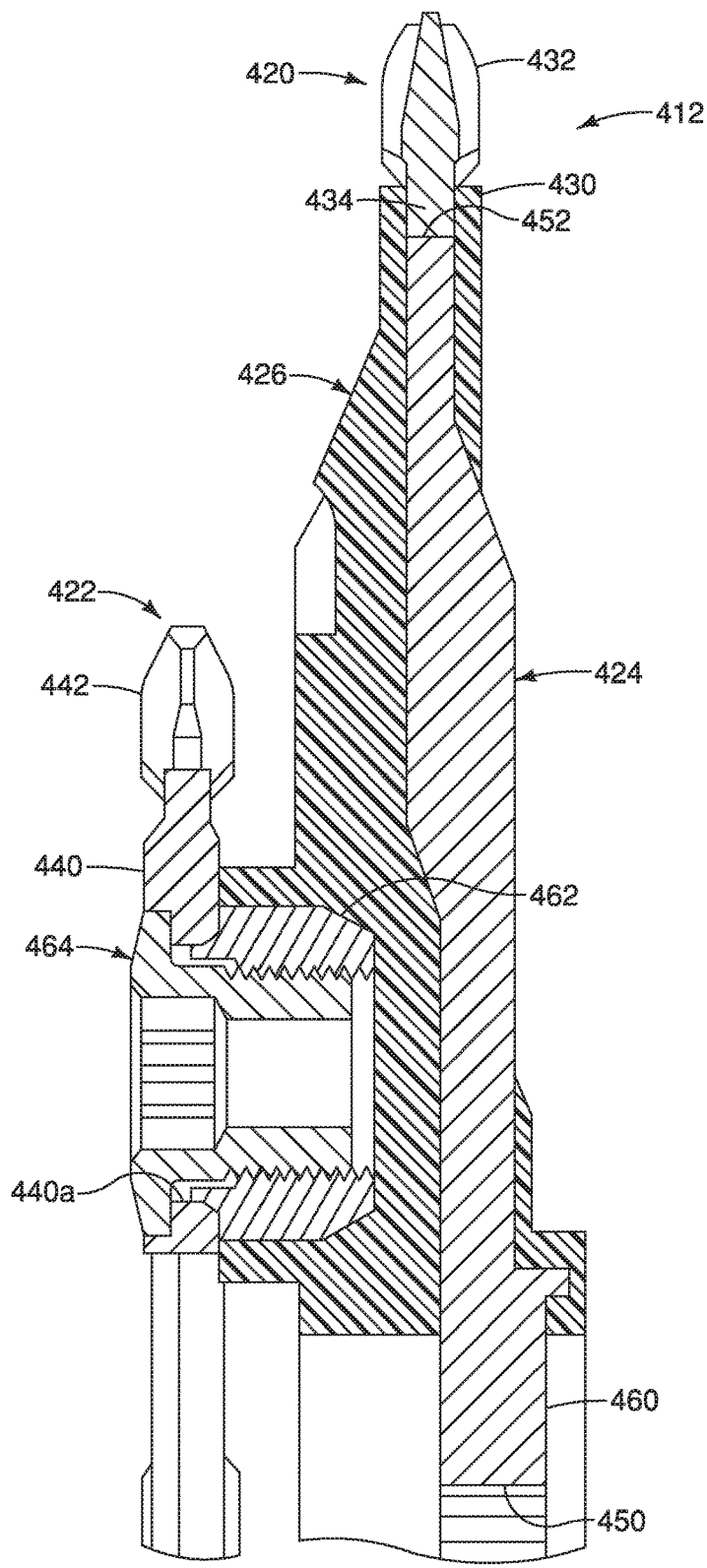
FIG. 21 is a cross sectional view of the bicycle front sprocket assembly illustrated in FIGS. 18 to 20 as seen along section line 21-21 of FIG. 19.

As seen in FIGS. 18 and 21, the attachment portion 434 of the first sprocket 420 and the sprocket mounting portion 452 of the sprocket carrier 424 are non-rotatably connected. The inner peripheral surface of the attachment portion 434 of the first sprocket 420 non-rotatably engages the outer peripheral surface of the sprocket mounting portion 452 of the sprocket carrier 424. In particular, the inner peripheral surface of the attachment portion 434 and the outer peripheral surface of the sprocket mounting portion 452 are non-circular mating surfaces that are engaged with each other to prevent relative rotation between the first sprocket 420 and the sprocket carrier 424. In the sixth embodiment, the non-circular mating surfaces are alternating concave and convex engagement portions that are configured to non-rotatably connect the first sprocket 420 to the sprocket carrier 424. The non-metallic material of the first sprocket body 430 is molded over the interface between the attachment portion 434 of the first sprocket 420 and the sprocket mounting portion 452 of the sprocket carrier 424 to integrally connect the first sprocket 420 and the sprocket carrier 424.

The sprocket carrier 424 further includes a plurality of arms 458 extending radially inward from the sprocket mounting portion 452. The sprocket carrier 424 further includes a crank arm mounting portion 460. The crank arm mounting portion 460 interconnects the inner ends of the arms 458. The torque transmitting profile 450 is formed on an inner periphery of the crank arm mounting portion 460. In this way, the torque transmitting profile 450 of the crank arm mounting portion 460 includes a plurality of splines configured to engage the mounting boss 14a of the bicycle crank arm 14 in a state where the sprocket carrier 424 is mounted to the bicycle crank arm 14. Thus, the sprocket carrier 424 includes "direct mount" splines or serrations. Same as the first embodiment, the rotational center axis A of the bicycle crank arm 14 passes through the mounting boss 14a.

The second sprocket 422 is attached to the sprocket carrier 424 by a plurality of fixing nuts 462 and a plurality of fixing bolts 464. The fixing nuts 462 are embedded in the non-metallic material of the first sprocket body 430. Alternatively, the fixing nut 462 can be integrally formed with the sprocket carrier 424 or the first sprocket 420 which are made of metallic material respectively. The fixing bolts 464 are inserted through openings 440a of the second sprocket 422 and then screwed into the fixing nuts 462 to attach the second sprocket 422 to the sprocket carrier 424. In this way, the second sprocket 422 can be easily detached from and reinstalled on the sprocket carrier 424 without damaging either the first sprocket 420 or the sprocket carrier 424. Alternatively, the sprocket carrier 424 can be provided with the second sprocket 422 as an integrated member, i.e. the second sprocket 422 can be directly mounted to the sprocket carrier 424 by a plurality of fixing nuts and a plurality of fixing bolts.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle front sprocket assembly. Accordingly, these directional terms, as utilized to describe the bicycle front sprocket assembly should be interpreted relative to a bicycle in an upright riding position on a horizontal surface and that is equipped with the bicycle front sprocket assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle front sprocket assembly comprising:
a first sprocket including a first sprocket body and a plurality of first sprocket teeth disposed on a first outer periphery of the first sprocket body;
a second sprocket including a second sprocket body and a plurality of second sprocket teeth disposed on a second outer periphery of the second sprocket body, the second sprocket being smaller than the first sprocket and being located adjacent to the first sprocket without another sprocket disposed axially between the first and second sprockets;
a sprocket carrier including a torque transmitting profile and a sprocket mounting portion; and
a chain guiding portion positioned between the first sprocket teeth and the second sprocket teeth in an axial direction parallel to a rotational center axis of the bicycle front sprocket assembly, the chain guiding portion being positioned radially outward with respect to the second sprocket teeth and including an inclined surface inclining from the first sprocket toward the second sprocket in the axial direction, the chain guiding portion being formed by a plurality of ribs,
at least one of the first sprocket and the second sprocket being mounted to the sprocket mounting portion of the sprocket carrier by a non-threaded fastener.

2. A bicycle front sprocket assembly comprising:
a first sprocket including a first sprocket body and a plurality of first sprocket teeth disposed on a first outer periphery of the first sprocket body, each of the first sprocket teeth having a first axial tooth center plane;
a second sprocket including a second sprocket body and a plurality of second sprocket teeth disposed on a second outer periphery of the second sprocket body, each of the second sprocket teeth having a second axial tooth center plane; and
a sprocket carrier including a torque transmitting profile and a sprocket mounting portion, the sprocket carrier being a separate member from both of the first and second sprockets, the sprocket carrier having a non-metallic portion and a metallic portion,
at least one of the first sprocket and the second sprocket being mounted to the sprocket mounting portion of the sprocket carrier by a non-threaded fastener that is received in a blind bore of the metallic portion of the sprocket carrier, and
a maximum axial distance defined between the first axial tooth center plane and the second axial tooth center plane in an axial direction parallel to a rotational center axis of the bicycle front sprocket assembly being smaller than or equal to 9.5 mm.

3. A bicycle front sprocket assembly comprising:
a first sprocket including a first sprocket body and a plurality of first sprocket teeth disposed on a first outer periphery of the first sprocket body;
a second sprocket including a second sprocket body and a plurality of second sprocket teeth disposed on a second outer periphery of the second sprocket body; and
a sprocket carrier including a torque transmitting profile and a sprocket mounting portion, the sprocket carrier having a non-metallic portion and a metallic portion,
at least one of the first sprocket and the second sprocket being mounted to the sprocket mounting portion of the sprocket carrier by a non-threaded fastener that is received in a blind bore of the metallic portion of the sprocket carrier,
at least one of the first sprocket teeth and the second sprocket teeth including at least one outer-link engaging tooth having a first axial width and at least one inner-link engaging tooth having a second axial width, and
the first axial width of the outer link engaging tooth being larger than the second axial width of the inner link engaging tooth.

4. A bicycle front sprocket assembly comprising:
a first sprocket including a first sprocket body and a plurality of first sprocket teeth disposed on a first outer periphery of the first sprocket body, each of the first sprocket teeth having a first axial tooth center plane;
a second sprocket including a second sprocket body and a plurality of second sprocket teeth disposed on a second outer periphery of the second sprocket body, each of the second sprocket teeth having a second axial tooth center plane; and
a sprocket carrier including a torque transmitting profile, the sprocket carrier having a non-metallic portion and a metallic portion;
at least one of the first and second sprockets and the sprocket carrier has an axial protuberance integrally formed therewith as a unitary one-piece member so as to be positioned between the sprocket carrier and one of the first sprocket and the second sprocket in an axial direction parallel to a rotational center axis of the bicycle front sprocket assembly;
the one of the first sprocket and the second sprocket being mounted to the sprocket carrier by a non-threaded fastener extending into the axial protuberance, the non-threaded fastener being received in a blind bore of the metallic portion of the sprocket carrier.

5. A bicycle front sprocket assembly comprising:
a first sprocket including a first sprocket body made of a non-metallic material and a plurality of first sprocket teeth disposed on a first outer periphery of the first sprocket body;
a second sprocket including a second sprocket body and a plurality of second sprocket teeth disposed on a second outer periphery of the second sprocket body; and
a sprocket carrier including a torque transmitting profile, the sprocket carrier having a non-metallic portion and a metallic portion,
at least one of the first sprocket and the second sprocket being mounted to the sprocket carrier by a non-threaded fastener that is received in a blind bore of metallic portion of the sprocket carrier.

6. The bicycle front sprocket assembly according to claim 2, wherein
the maximum axial distance defined between the first axial tooth center plane and second axial tooth center plane in the axial direction is larger than or equal to 7.0 mm.

7. The bicycle from sprocket assembly according to claim 2, wherein
the sprocket carrier is axially positioned between the first sprocket and the second sprocket in the axial direction.

8. The bicycle front sprocket assembly according to claim 1, wherein
each of the first sprocket and the second sprocket is mounted to the sprocket mounting portion of the sprocket carrier by the non-threaded fastener.

9. The bicycle front sprocket assembly according to claim 1, wherein
the at least one of the first sprocket and the second sprocket is mounted to the sprocket mounting portion of the sprocket carrier by a plurality of the non-threaded fasteners.

10. The bicycle front sprocket assembly according to claim 1, wherein
each of the first sprocket and the second sprocket is mounted to the sprocket mounting portion of the sprocket carrier by a plurality of the non-threaded fasteners.

11. The bicycle front sprocket assembly according to claim 1, wherein
at least one of the first sprocket teeth and the second sprocket teeth includes at least one outer-link engaging tooth having a first axial width and at least one inner-link engaging tooth having a second axial width, and
the first axial width of the outer link engaging tooth is larger than the second axial width of the inner link engaging tooth.

12. The bicycle front sprocket assembly according to claim 11, wherein
each of the first and second sprocket teeth includes the at least one outer-link engaging tooth and the at least one inner-link engaging tooth.

13. The bicycle front sprocket assembly according to claim 12, wherein
the at least one outer-link engaging tooth of each of the first and second sprocket teeth includes a plurality of outer-link engaging teeth, and
the at least one inner-link engaging tooth of each of the first and second sprocket teeth includes a plurality of inner-link engaging teeth.

14. The bicycle front sprocket assembly according to claim 1, wherein
at least one of the first and second sprockets and the sprocket carrier has an axial protuberance integrally formed therewith as a unitary one-piece member so as to be positioned between the sprocket carrier and the one of the first sprocket and the second sprocket in the axial direction, and
the non-threaded fastener extends into the axial protuberance.

15. The bicycle front sprocket assembly according to claim 14, wherein
the axial protuberance is integrally formed with the sprocket carrier.

16. The bicycle front sprocket assembly according to claim 2, further comprising
a chain guiding portion positioned between the first sprocket teeth and the second sprocket teeth in the axial direction.

17. The bicycle front sprocket assembly according to claim 1, wherein
the first sprocket body is at least partly made of a non-metallic material.

18. The bicycle front sprocket assembly according to claim 17, wherein
the first sprocket teeth are made of a metallic material.

19. The bicycle front sprocket assembly according to claim 18, wherein
the first sprocket body is integrally molded onto the first sprocket teeth.

20. The bicycle front sprocket assembly according to claim 19, wherein
the second sprocket teeth are made of a metallic material and attached to the sprocket carrier by the non-threaded fastener.

21. The bicycle front sprocket assembly according to claim 1, wherein
the non-threaded fastener includes a pin non-detachably fastening the at least one of the first sprocket and the second sprocket to the sprocket mounting portion of the sprocket carrier.

22. The bicycle front sprocket assembly according to claim 21, wherein
the pin includes a rivet.

23. The bicycle front sprocket assembly according to claim 1,
wherein
the sprocket carrier includes a crank arm mounting portion that includes a plurality of splines configured to engage a mounting boss of a bicycle crank arm in a state where the sprocket carrier is mounted to the bicycle crank arm, the rotational center axis passing through the mounting boss.

24. A bicycle front sprocket assembly comprising:
a first sprocket including a first sprocket body at least partly made of a non-metallic material and a plurality of first sprocket teeth disposed on a first outer periphery of the first sprocket body;
a second sprocket including a second sprocket body and a plurality of second sprocket teeth disposed on a second outer periphery of the second sprocket body, the second sprocket being smaller than the first sprocket and being located adjacent to the first sprocket without another sprocket disposed axially between the first and second sprockets; and
a sprocket carrier being integrally provided with one of the first sprocket and the second sprocket, the sprocket carrier including a crank arm mounting portion that includes a plurality of splines configured to engage a mounting boss of a bicycle crank arm in a state where the sprocket carrier is mounted to the bicycle crank arm, a rotational center axis of the bicycle crank arm passing through the mounting boss; and
a chain guiding portion positioned between the first sprocket teeth and the second sprocket teeth in an axial direction that is parallel to a rotational center axis of the bicycle front sprocket assembly, the chain guiding portion being positioned radially outward with respect to the second sprocket teeth and including an inclined surface inclining from the first sprocket toward the second sprocket in the axial direction, the chain guiding portion being formed by a plurality of ribs.

25. A bicycle front sprocket assembly comprising:
a first sprocket including a first sprocket body and a plurality of first sprocket teeth disposed on a first outer periphery of the first sprocket body, each of the first sprocket teeth having a first axial tooth center plane;
a second sprocket including a second sprocket body and a plurality of second sprocket teeth disposed on a second outer periphery of the second sprocket body, each of the second sprocket teeth having a second axial tooth center plane, the second sprocket being smaller than the first sprocket and being located adjacent to the first sprocket without another sprocket disposed axially between the first and second sprockets;
a sprocket carrier including a torque transmitting profile and a sprocket mounting portion; and
a chain guiding portion positioned between the first sprocket teeth and the second sprocket teeth in an axial direction parallel to a rotational center axis of the bicycle front sprocket assembly, the chain guiding portion being positioned radially outward with respect to the second sprocket teeth and including an inclined surface inclining from the first sprocket toward the second sprocket in the axial direction, the chain guiding portion being formed by a plurality of ribs,
a maximum axial distance defined between the first axial tooth center plane and the second axial tooth center plane in the axial direction being smaller than or equal to 9.5 mm, at least one of the first sprocket teeth and the second sprocket teeth including at least one outer-link engaging tooth having a first axial width and at least one inner-link engaging tooth having a second axial width, and the first axial width of the outer link engaging tooth being larger than the second axial width of the inner link engaging tooth.

* * * * *